United States Patent
Ko et al.

(10) Patent No.: US 9,712,308 B2
(45) Date of Patent: Jul. 18, 2017

(54) METHOD FOR ENHANCING SMALL CELL

(71) Applicant: Electronics and Telecommunications Research Institute, Daejeon (KR)

(72) Inventors: Young Jo Ko, Daejeon (KR); Jae Young Ahn, Daejeon (KR); Bang Won Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 103 days.

(21) Appl. No.: 14/760,245

(22) PCT Filed: Jan. 9, 2014

(86) PCT No.: PCT/KR2014/000273
§ 371 (c)(1),
(2) Date: Jul. 10, 2015

(87) PCT Pub. No.: WO2014/109580
PCT Pub. Date: Jul. 17, 2014

(65) Prior Publication Data
US 2015/0365831 A1    Dec. 17, 2015

(30) Foreign Application Priority Data

Jan. 10, 2013 (KR) .................. 10-2013-0002972
Mar. 11, 2013 (KR) .................. 10-2013-0025691
Jul. 2, 2013 (KR) .................. 10-2013-0077337
Jan. 9, 2014 (KR) .................. 10-2014-0002882

(51) Int. Cl.
*H04W 4/00* (2009.01)
*H04L 5/00* (2006.01)
*H04W 84/04* (2009.01)
*H04L 5/14* (2006.01)

(52) U.S. Cl.
CPC ............ *H04L 5/0053* (2013.01); *H04L 5/001* (2013.01); *H04L 5/1469* (2013.01); *H04W 84/045* (2013.01)

(58) Field of Classification Search
CPC ..... H04L 5/0053; H04L 5/001; H04L 5/1469; H04W 84/045
See application file for complete search history.

(56) References Cited

U.S. PATENT DOCUMENTS 8,593,936 B2    11/2013  Ko et al.
9,319,194 B2 *  4/2016   Dinan ................... H04L 5/0007
2011/0038271 A1  2/2011  Shin et al.
(Continued)

FOREIGN PATENT DOCUMENTS

KR    20020093322 A    12/2002
KR   1020100083440 A    7/2010
(Continued)

*Primary Examiner* — Robert Wilson
(74) *Attorney, Agent, or Firm* — William Park & Associates Ltd.

(57) ABSTRACT

Disclosed is a method for enhancing a small cell. A method for enhancing a small cell in a terminal applying inter-site CA includes the steps of: causing a terminal to transmit the uplink control information (UCI) of at least one of the macro cells controlled by a macro cell base station through the macro cell; and causing the terminal to transmit the uplink control information of at least one of the small cells controlled by a small cell base station through the small cell.

15 Claims, 17 Drawing Sheets

(56) References Cited

U.S. PATENT DOCUMENTS

| | | |
|---|---|---|
| 2011/0268075 A1 | 11/2011 | Heo et al. |
| 2012/0142365 A1 | 6/2012 | Ahn et al. |
| 2012/0213170 A1* | 8/2012 | Choi et al. ............ H04L 1/1861 370/329 |
| 2012/0287828 A1 | 11/2012 | Chen et al. |
| 2012/0307821 A1 | 12/2012 | Kwon et al. |
| 2013/0242881 A1 | 9/2013 | Wang et al. |
| 2013/0242923 A1* | 9/2013 | Yang et al. ........... H04L 1/1825 370/329 |
| 2013/0279459 A1 | 10/2013 | Lee et al. |
| 2014/0010139 A1* | 1/2014 | Choi et al. .............. H04W 4/06 370/312 |
| 2014/0348146 A1* | 11/2014 | Malkam ki et al. ...... H04J 3/16 370/337 |
| 2015/0156764 A1* | 6/2015 | Yang et al. ........... H04L 1/0076 370/329 |
| 2015/0365831 A1* | 12/2015 | Ko et al. ............... H04L 5/0053 370/329 |
| 2016/0261296 A1* | 9/2016 | Ouchi et al. .......... H04W 72/12 |

FOREIGN PATENT DOCUMENTS

| | | |
|---|---|---|
| KR | 20110073217 A | 6/2011 |
| KR | 1020110063279 A | 6/2011 |
| KR | 1020110082489 A | 7/2011 |
| KR | 1020110127677 A | 11/2011 |
| KR | 1020120058382 A | 6/2012 |
| WO | 2011099795 A2 | 8/2011 |

* cited by examiner

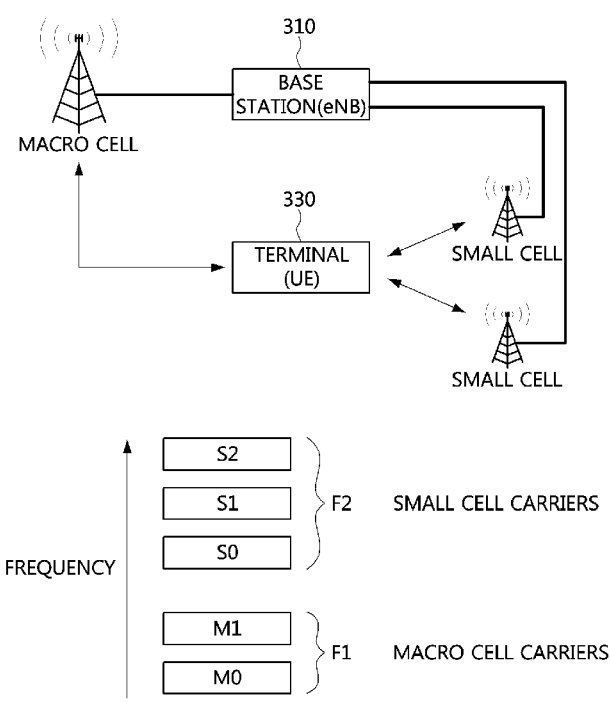

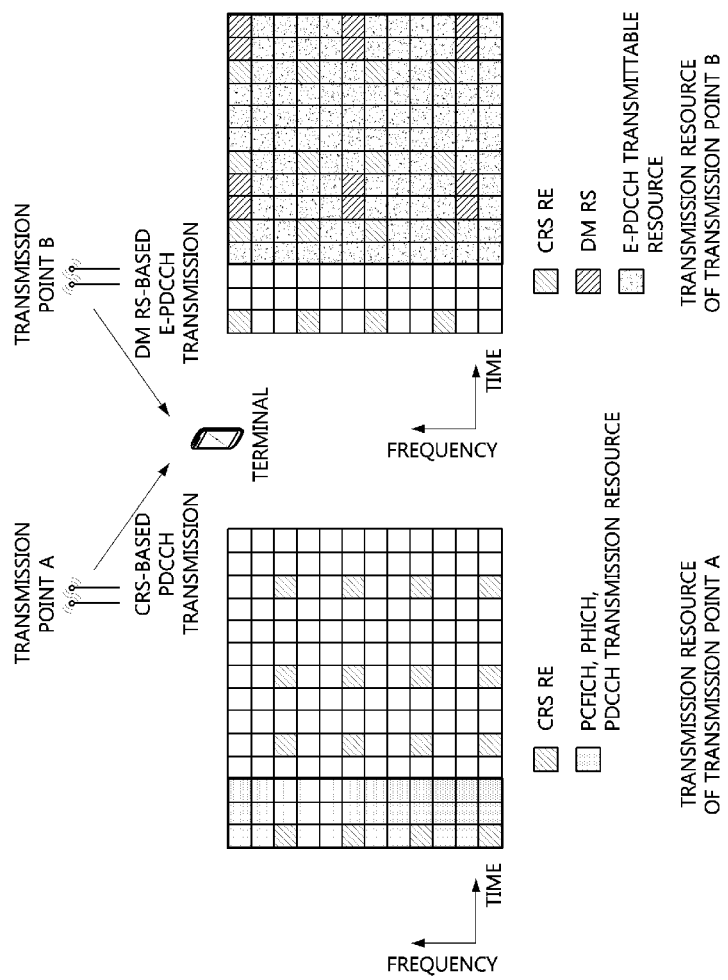

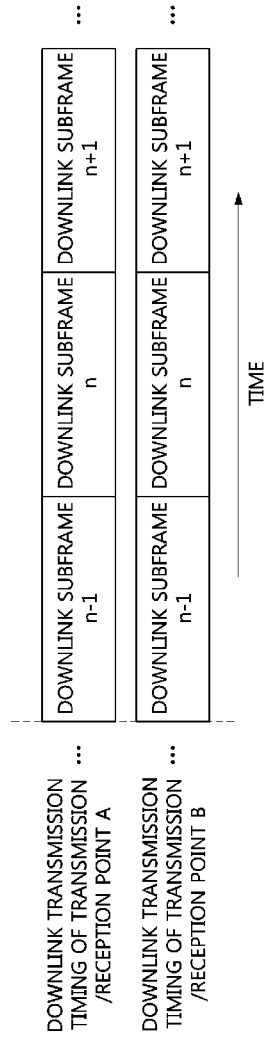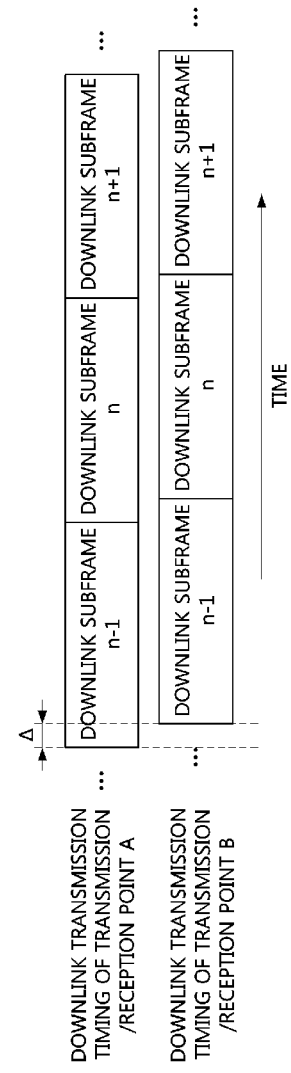

METHOD FOR ENHANCING SMALL CELL

TECHNICAL FIELD

The present invention relates to mobile communication technology, and more particularly, to a method for enhancing a small cell.

BACKGROUND ART

Recently, along with the widely use of portable mobile terminals and table PCs and the rapid expansion of mobile computing based on wireless Internet technology, a dramatic increase in wireless network capacity is being requested.

In much research, traffic use amounts of mobile users are predicted to significantly increase in future. A method of applying an enhanced physical layer technique or allocating an additional spectrum may be considered as a representative solution to satisfy requirements resulting from an explosive increase in traffic. However, the physical layer technique has reached a theoretical limit, and the increase in capacity of a cellular network through the allocation of the additional spectrum cannot be a fundamental solution.

Accordingly, as a method for efficiently supporting user data traffic that explosively increases in a cellular network, a method of densely installing a larger number of small cells with reduced sizes or providing service using a cellular network having a multi-layer structure may be considered as a practical alternative.

The Long Term Evolution (LTE)-Advanced standardization group of the 3rd Generation Partnership Project (3GPP) organization has been standardizing technology for small cell enhancement in order to efficiently accommodate the demand for data traffic increasing rapidly.

However, up to date, only discussions of scenarios and requirements for small cell enhancement are taking place, and a detailed procedure or method has not been presented for the small cell enhancement.

DISCLOSURE

Technical Problem

The objective of the present invention is to provide a method for enhancing a small cell, which may be applied to a cellular mobile communication system.

Technical Solution

One aspect of the present invention provides a method for enhancing a small cell, which is performed by a terminal applying inter-site carrier aggregation (CA), the method including: transmitting uplink control information regarding at least one of macro cells managed by a macro cell base station through the macro cell; and transmitting uplink control information regarding at least one of small cells managed by a small cell base station through the small cell.

Another aspect of the present invention provides a method for enhancing a small cell, which is performed by a base station supporting inter-site CA, the method including: setting a plurality of cells as cell groups; setting the cell groups as a primary cell group and at least one secondary cell group; and transmitting information on the set cell groups to the terminal.

Further another aspect of the present invention provides a method for enhancing a small cell, which is performed by a terminal applying inter-site CA having non-ideal backhaul, the method including: receiving indication information regarding a transmission form of an uplink control channel from a base station; and transmitting only one of a first uplink control channel for a first cell group and a second uplink control channel for a second cell group to a corresponding cell group or simultaneously transmitting the first uplink control channel and the second uplink control channel to respective cell groups based on the received indication information.

Still further another aspect of the present invention provides a method for enhancing a small cell, which is performed by a terminal having dual connectivity with two reception points, the method including: receiving uplink transmission timing information corresponding to the two reception points from a base station; and performing uplink transmission in any subframe using a specific reception point corresponding to the subframe and an uplink transmission timing corresponding to the specific reception point.

Still further another aspect of the present invention provides a method for enhancing a small cell, which is performed by a terminal applying inter-eNB CA in a frequency division duplex (FDD) type base station and a time division duplex (TDD) type base station, the method including transmitting HARQ-ACK information for a downlink channel transmitted by an FDD type cell and HARQ-ACK information for a downlink channel transmitted by a TDD type cell via an uplink of the FDD type cell.

Still further another aspect of the present invention provides a method for enhancing a small cell, which is performed by a terminal, the method including: receiving TDD carrier configuration information including an additional carrier configuration; and transmitting a sounding reference signal in some or all of special subframes of a TDD carrier based on the received TDD carrier configuration information.

Advantageous Effects

As described above, according to the method for enhancing a small cell, a method of dividing functions of a macro layer and a small cell layer, a method for enhancing inter-site CA having ideal backhaul, a method of supporting inter-site CA having non-ideal backhaul, a method of supporting dual connectivity, a method of supporting FDD/TDD CA, a method of configuring a new TDD carrier, a method of discovering a cell, and a method for enhancing transmission/reception of a small cell are provided in detail.

Accordingly, the small cell enhancement technique may be easily applied to cellular mobile communication systems such as an LTE or LTE-Advanced, thereby dramatically increasing wireless network capacity.

DESCRIPTION OF DRAWINGS

FIG. 3 illustrates downlink frequency allocation of a terminal applying intra-eNB CA.

FIG. 8 illustrates a control channel resource division method of two transmission points that use different cell IDs.

FIG. 9 illustrates a downlink transmission timing method of two transmission/reception points.

MODES OF THE INVENTION

Since the present invention may be variously modified and have several exemplary embodiments, specific exemplary embodiments will be shown in the accompanying drawings and be described in detail in a detailed description.

However, it should be understood that the present invention is not limited to these embodiments, and may include any and all modifications, equivalents, substitutions and the like within the spirit and scope thereof.

The terms used in the present specification are set forth to explain the embodiments of the present invention, and the scope of the present invention is not limited thereto. The singular forms 'a,' 'an,' and 'the' include plural reference unless the context clearly dictates otherwise. In the present specification, it will be understood that the terms "have," "comprise," "include," and the like are used to specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. Terms, such as terms that are generally used and have been defined in dictionaries, should be construed as having meanings matched with contextual meanings in the art. In this description, unless defined clearly, terms are not interpreted in an idealized or overly formal sense.

The term "terminal" used herein may be referred to as a user equipment (UE), a mobile station (MS), a mobile terminal (MT), a user terminal (UT), a wireless terminal, an access terminal (AT), a subscriber unit, a subscriber station (SS), a wireless device, a wireless communication device, a wireless transmit/receive unit (WTRU), a mobile node, a mobile, or the like.

In addition, the term "base station" used herein generally denotes a fixed point that is in communication with a terminal and may be referred to as a base station, a Node-B, an eNode-B, a base transceiver system (BTS), an access point, and so on.

In addition, the term "transmission point" used herein denotes a transmission/reception device that may include at least one transmission/reception antenna and be connected to a base station through an optical fiber or microwave to transmit and receive information to and from the base station, and may be referred to as a remote radio head (RRH), a remote radio unit (RRU), a distributed antenna, etc.

Hereinafter, preferred embodiments of the present invention will be described in detail with reference to the accompanying drawings. In describing the invention, in order to facilitate the entire understanding of the invention, like numbers refer to like elements throughout the description of the figures and the repetitive description thereof will be omitted.

Cell Arrangement Scenario

Figure 1:
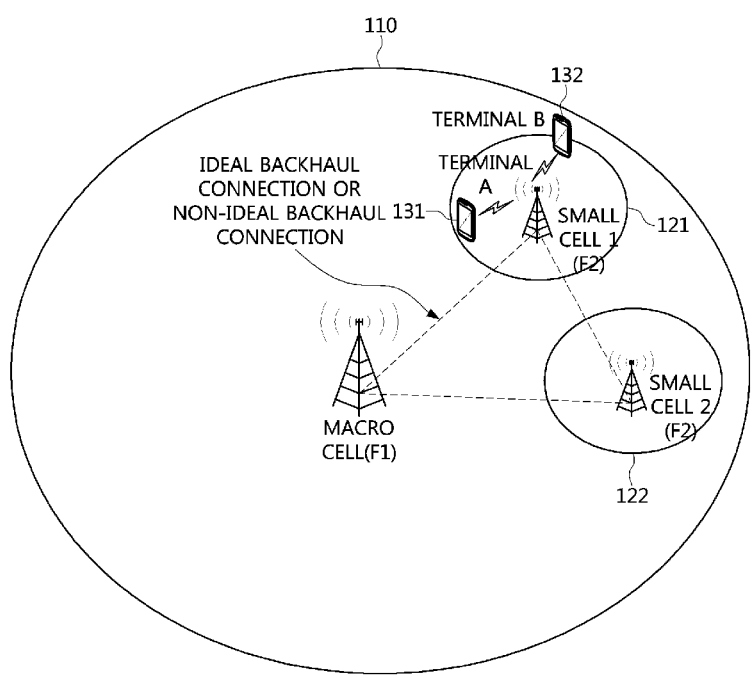
FIG. 1 is a conceptual diagram illustrating a cell arrangement scenario for small cell enhancement.

FIG. 1 is a conceptual diagram illustrating a cell arrangement scenario for small cell enhancement.

FIG. 1 illustrates an example in which small cells 121 and 122 are arranged within the coverage of a macro cell 110.

In FIG. 1, the macro cell 110 may be configured to use a frequency band F1, and the small cells 121 and 122 may be configured to use a frequency band F2. In addition, ideal backhaul or non-ideal backhaul may be formed between the macro cell 110 and the small cells 121 and 122 and between the small cells 121 and 122.

Among small cell enhancement techniques, inter-site carrier aggregation (hereinafter referred to as inter-site CA) has attracted the greatest attention. Inter-site CA denotes using a CA technique with two or more cells having different transmission/reception positions. As an application example of the inter-site CA, the macro cell 110 and the small cell 121 that use different frequencies (or carriers) may be set in a terminal 131 as cells constituting the CA. A cell arrangement scenario that is generally considered is to use a macro cell to provide service coverage and to use a small cell to increase a data transfer rate. The CA in the LTE Release-10/11 is standardized on the assumption of intra-site carrier aggregation (hereinafter referred to as intra-site CA). Intra-site CA can assume ideal backhaul connectivity in which transmission/reception points of cells grouped by the CA are located at the same place and there are no problems in signal delivery delay and transfer capacity limitation between cells under a control of a base station.

The LTE Release-10/11 standardization can also support the inter-site CA when the cells have the ideal backhaul connectivity. On the contrary, when the cells have non-ideal backhaul connectivity in which there is the signal delivery delay or transfer capacity limitation, it is difficult to use an existing standardization to support Inter-site CA. In the 3GPP, the inter-site CA between the macro cell and the small cell that are connected via the non-ideal backhaul may be called a dual connectivity operation.

Especially, for an uplink,

The current specification defines that a physical uplink control channel (PUCCH) is transmitted only using a primary cell (hereinafter referred to as "Pcell"). In this case, if cells that are set for the CA have backhaul connectivity with the terminal, the terminal transmits Hybrid Automatic Repeat reQuest (HARQ)-ACK for a physical downlink shared channel (PDSCH) received by a secondary cell (hereinafter referred to as "Scell") through Pcell, and thus Scell should receive HARQ-ACK information from Pcell, but may not receive the HARQ-ACK from Pcell within an appropriate time due to the non-ideal backhaul. In addition, Scell should receive uplink control information (hereinafter referred to as "UCI") such as a scheduling request (hereinafter referred to as "SR"), channel state information (hereinafter referred to as "CSI"), or the like from Pcell, and thus a problem may occur in dynamic resource allocation and link adaption due to time delay.

The current specification limits the total sum of power transmitted to Pcell and Scell. According, on a condition that cooperation between Pcell and Scell cannot be accomplished within a short time, the terminal may not instantly find power headroom (PHR) for each cell, and thus a problem may occur in power control and link adaptation.

As illustrated in FIG. 1, for downlink transmission, it is assumed that the macro cell 110 uses a carrier frequency F1, and the small cells 121 and 122 use a carrier frequency F2, which is different from F1. Table 1 shows an example of setting Pcell and Scell under the above-described conditions.

TABLE 1

| Terminal | Pcell | Scell |
|---|---|---|
| Terminal A | Macro cell | Small cell |
| Terminal B | Small cell | Macro cell |

As shown in Table 1, CA may be applied to terminal A 131, and Pcell of terminal A 131 may be set as the macro cell (using F1) 110, and Scell thereof may be set as the small cell (using F2) 121. In addition, CA may be applied to terminal B 132, and Pcell of terminal B 132 may be set as the small cell (using F2) 121, and Scell thereof may be set as the macro cell (using F1) 110. When consideration is taken on the basis of a downlink, terminal A 131 receives a signal with a greater magnitude from the macro cell 110, and terminal B 132 receives a signal with a greater magnitude from the small cell 121. Thus, the settings as illustrated in table 1 are preferable.

However, for an uplink, it may be more beneficial that the small cell 121 receives a signal of terminal A 131 in terms of power consumption and interference control of the terminal. In the legacy LTE Release-10/11 specification, the terminal should always transmit the PUCCH using Pcell. However, considering the above-described situation, it is preferable to modify the legacy specification to allow the terminal to transmit the PUCCH using Scell. That is, there is a need to change the specification such that the PUCCH may be received in Scell, other than Pcell in the legacy specification. For example, a terminal with high channel quality (geometry) for uplinks of the macro cell and the small cell may be allowed to transmit the PUCCH to Pcell and Scell simultaneously in the same subframe. Alternatively, when the terminal has a downlink having higher quality than that of the macro cell and an uplink having higher quality than that of the small cell, PUCCH may be allowed to be transmitted using the small cell although Pcell is designated as the macro cell. In addition, a terminal having low channel quality is allowed to temporally separate and transmit PUSCHs/PUCCHs of Pcell and Scell in further consideration of problems about maintaining low peak-to-average power ratio (PAPR) and limiting maximum power, thereby preventing simultaneous transmissions of two PUCCHs to two cells.

According to the LTE Release-10/11 specification, the terminal may be aware of a uplink carrier connected to a downlink Pcell by System Information Block Type 2 (SIB2) information, and may be allowed to set an uplink carrier connected with the downlink Pcell as an uplink Pcell and transmit the PUCCH only to Pcell. However, according to Inter-site CA, the PUCCH needs to be transmitted to a cell that is advantageous in terms of power consumption of the terminal in consideration of link budget. Accordingly, a network needs to flexibly set the uplink carrier of Pcell.

PUCCH transmission of the terminal may be classified as follows:

Case A: Transmit PUCCH only to a macro cell;
Case B: Transmit PUCCH only to a small cell;
Case C: Enable transmission of PUCCH to both a macro cell and a small cell, but not at the same time; and
Case D: Enable transmission of PUCCH to the two cells at the same time.

When cells have non-ideal backhaul, it is difficult to apply case A and case B to the PUCCH transmission of the terminal due to delay in the information transfer between the macro cell and the small cell. When the terminal has high channel quality with respect to both the macro cell and the small cell, case D may be applied. When the terminal has low channel quality with respect to both the macro cell and the small cell, case C may be applied.

When cells have ideal backhaul, any one of case A, case B, case C, and case D may be applied. However, it is preferable to determine which case to use according to the channel quality of the terminal with respect to each cell.

In addition, the terminal needs to consider a set of carriers using the same power amplifier (PA) (or the same PA carrier group). One Pcell may be determined and used for carriers in the same site, as in the LTE Release-10 specification. Meanwhile, inter-site CA in which a carrier used in each site is different may consider a scheme in which one cell functioning as Pcell is placed in each site. When the terminal uses a different PA for a different carrier, the terminal has no PAPR problem but still maximum power limitation problem.

When cells have non-ideal backhaul, the terminal is allowed to transmit the PUCCH to the macro cell and the small cell independently. However, as described above, it is preferable to determine a transmission type according to a channel environment of the terminal.

How to Divide Functions Between Macro Layer and Small Cell Layer

Figure 2:
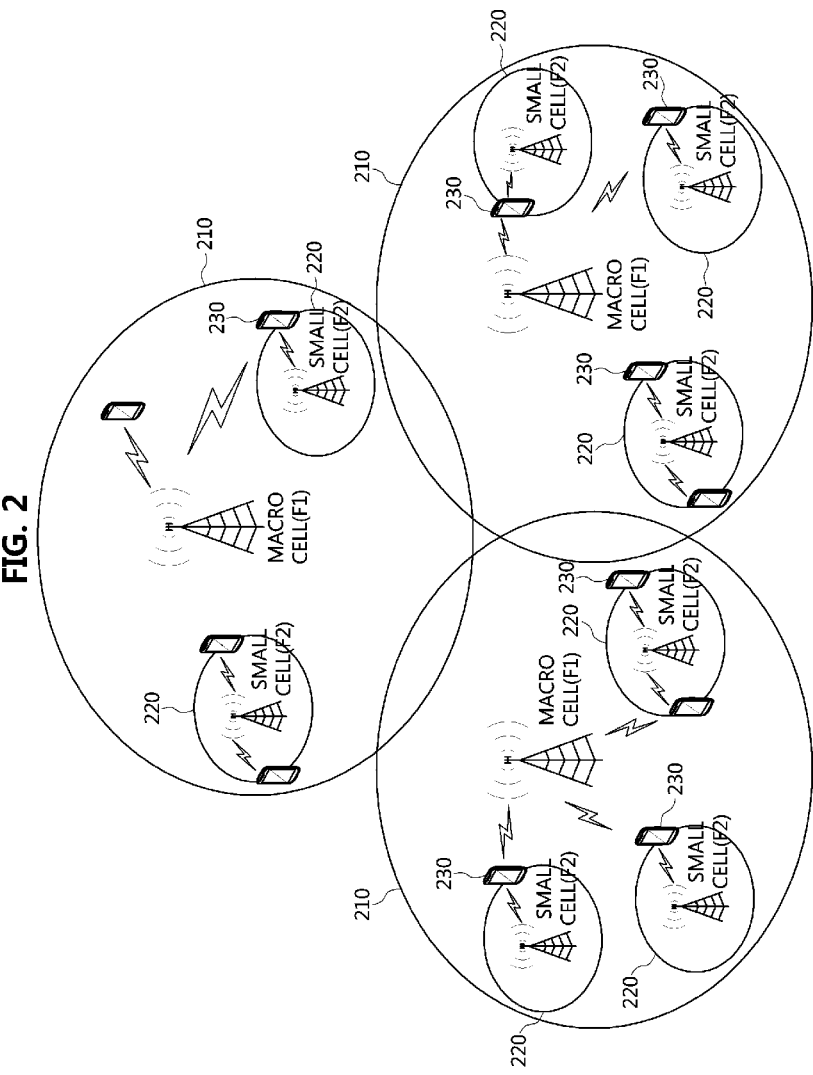
FIG. 2 is a conceptual diagram illustrating a heterogeneous network environment including macro cells and small cells.

FIG. 2 is a conceptual diagram illustrating a heterogeneous network environment including macro cells and small cells.

In FIG. 2, it is assumed that a frequency F1 of a macro layer including macro cells 210 is different from a frequency F2 of a small layer including small cells 220. Table 2 shows a preferred form of performing major functions of the macro layer and the small layer on a terminal 230 that is served by the macro layer and the small cell layer under the above-described assumption.

TABLE 2

| Function | Macro layer | Small cell layer |
|---|---|---|
| RRC connection/release | Performance | Non-Performance |
| Wireless resource setting | Performance | Performance |

TABLE 2-continued

| Function | Macro layer | Small cell layer |
| --- | --- | --- |
| RRM measurement setting/reporting | Performance | Non-Performance |
| Mobility control such as hand-over | Performance | Non-Performance |
| Data traffic transmission/reception | Performance | Performance |

The terminal 230 that is in a radio resource control (RRC)-connected state, is served by the macro layer and the small cell layer, and has inter-site CA set thereto may receive an instruction such as RRC connection establishment, re-establishment, and release through the macro layer and receive mobility management such as RRM measurement, handover, or the like through the macro layer. Transmission and reception of the data traffic may be performed mainly using the small cell layer, but also performed using the macro layer.

The terminal that is in an idle state performs tracking area update through the macro layer, receives paging, and attempts RRC connection through the macro layer.

Here, the terminal that establishes initial RRC connection through the macro layer may be handed over to the small cell layer and managed only by the small cell layer. On the contrary, the terminal that establishes initial RRC connection through the macro layer may be served only by the macro layer. The all above-described cases correspond to a case of non-carrier aggregation.

How to Enhance Inter-Site CA Having Ideal Backhaul

The form of the inter-site CA may be classified into intra-eNB CA, inter-eNB CA, and a combination of the intra-eNB CA and the inter-eNB CA. It is assumed that the CA described in the legacy LTE Release-10/11 corresponds to the intra-eNB CA, and all cells grouped by the intra-eNB CA enable a dynamic scheduling cooperation by one base station. On the contrary, the inter-eNB CA has problems of time delay generated in communication between base stations and capacity limitation in communication lines, and thus it may be difficult for all cells grouped by the CA to perform a dynamic scheduling cooperation through one central control. Thus, it is difficult to apply the CA of the LTE Release-10/11 that is based on the dynamic scheduling cooperation between the cells grouped by the CA. A most general form of the inter-site CA may be a form including both the intra-eNB CA and the inter-eNB CA. In the 3GPP, the inter-eNB CA between the macro cell eNB and the small cell eNB that are connected via the non-ideal backhaul may be called a dual connectivity operation.

In general, it is assumed that the CA described in the LTE Release-10/11 specification allows the dynamic scheduling cooperation between cells that participate in the CA. However, in order to support the inter-site CA in more cases, there is a need to support the inter-site CA through supplementation of the specification even when the dynamic scheduling cooperation between the cells participating in the CA is disallowed. A general implementation of the Inter-site CA may be a CA in which cells managed by one eNB participate or a CA in which cells managed by one or more eNB participate. In terms of a physical layer air interface specification between the terminal and the base station, it is important to efficiently support the inter-site CA corresponding to various implementations such as intra-eNB, inter-eNB, and so on. In terms of the air interface specification, flexible specification support is preferable, which does not depend on a specific implementation of a network.

A case in which the macro cell and the small cells have ideal connectivity is considered below. The case in which the macro cells and the small cells have ideal connectivity denotes a case in which the dynamic scheduling cooperation between the cells is allowed. In general, when the CA is not used in a network in which a Coordinated MultiPoint (CoMP) function is not introduced, transmission and reception of control information and data between the terminal and the base station are accomplished using one cell. On the contrary, according to the LTE Release-10/11 specification, when using the CA, the terminal has a cell that operates at a main frequency (or carrier), which is referred to as Pcell. The terminal performs initial connection establishment and connection re-establishment through Pcell. Other carriers are referred to as Scell. When RRC connection is established, Scell may be set for the terminal. The base station notifies the terminal of an uplink carrier connected with a downlink carrier through System Information Block Type 2 (SIB2) information. Accordingly, an uplink carrier corresponding to Pcell of the terminal is the uplink carrier connected by the SIB information. System information of Scell is transmitted from the base station to the terminal through terminal-specific RRC signaling. In addition, the terminal transmits the PUCCH using Pcell.

How to Set PUCCH Transmission Cell

For a terminal for which the CA is set, there is a need to supplement the LTE specification such that the PUCCH may be transmitted using any one of the cells that are set by the CA. In particular, when the CA is set with the macro cell and the small cells, path losses from the terminal to the macro cell and the small cell may be different. Thus, it is preferable that the PUCCH is transmitted using a small cell with a low path loss in consideration of the power loss of the terminal. A method of setting the PUCCH transmission cell is described in detail below.

[Method 1] Set PUCCH Transmission Cell Through Terminal-Specific RRC Signaling

The LTE Release-10/11 specification defines that the terminal transmits the PUCCH only using a cell that is designated as Pcell. In the present invention, the existing specification is improved. Thus, the base station sets, through terminal-specific RRC signaling, a cell to be used to transmit the PUCCH to the terminal, and the terminal is allowed to transmit the PUCCH using the set cell after receiving the RRC signaling. That is, in terms of the UCI transmission, the terminal recognizes the designated PUCCH transmission cell as Pcell to perform the UCI transmission.

FIG. 3 illustrates downlink frequency allocation of a terminal 330 applying the intra-eNB CA and shows a downlink carrier configured for the terminal 330 for which the CA is set.

As illustrated in FIG. 3, with respect to the terminal 330 applying the intra-eNB CA, the macro cell may use downlink frequencies M0 and M1, and the small cells may use and allocate downlink frequencies S0, S1, and S2.

In addition, through the change in the LTE specification, when a macro cell using the downlink frequency (or carrier) M0 is set as Pcell of the terminal 330, the terminal 330 may be set to transmit the PUCCH using an uplink carrier corresponding to the downlink frequency (or carrier) S0 the small cell uses.

In the above scheme, the PUCCH transmission cell is recognized as Pcell in terms of only the UCI transmission. Thus, the uplink/downlink data transmission and downlink control information transmission other than the UCI are not affected by the PUCCH transmission cell setting. However, it is preferable that the PUSCH transmission by the semi-persistent scheduling (SPS) is allowed to be performed by a cell set as the PUCCH transmission cell other than the existing set Pcell.

However, in the above-described PUCCH cell setting scheme, only PUCCH transmission cell is additionally set without changing a connection between the uplink carrier and the downlink carrier of Pcell designated by the SIB2. Thus, when the cell that is set as the uplink PUCCH transmission cell is not Pcell, a problem caused by deactivation of the PUCCH transmission cell may occur, and additional specification supplementation is needed to prevent occurrence thereof. The simplest method associated with the deactivation of the PUCCH transmission cell is to prohibit the deactivation of the PUCCH transmission cell. For example, when Scell of the terminal is set as the PUCCH transmission cell of the terminal (see (b) of FIG. 4), deactivation of a corresponding cell may be prohibited. When the deactivation of the PUCCH transmission cell is prohibited, the terminal should always monitor downlink physical downlink control channel (PDCCH) of the corresponding cell.

If the deactivation of the PUCCH transmission cell is allowed, new additional specification supplementation is need for operations of the terminal performed when the PUCCH transmission cell is deactivated. The operations of the terminal performed when the PUCCH transmission cell is deactivated will be described as an example below.

When the PUCCH transmission cell is deactivated, the terminal may follow the existing deactivation operation as follows:

Channel Quality Indicator (CQI), Precoder Matrix indicator (PMI), Rank Indicator (RI), and Precoding Type Indicator (PTI) are not reported to the corresponding cell;

Uplink Shared Channnel (UL-SCH) transmission of the corresponding cell is not performed;

The PDCCH transmitted by the corresponding cell (enhanced PDCCH (EPDCCH)) is not monitored; and The PDCCH for the corresponding cell (EPDCCH) is not monitored.

Even when the PUCCH transmission cell is deactivated, the terminal may perform operations to be described below:

Reporting of HARQ-ACK CQI/PMI/RI/PTI and transmission of SR to remaining cell(s) including Pcell are still performed using the PUCCH transmission cell. That is, in terms of the UCI transmission, the terminal still recognizes the PUCCH transmission cell as Pcell to perform the transmission; and In a default operation, the corresponding cell does not perform sounding reference signal (SRS) transmission. However, the corresponding cell may allow the SRS transmission in order to transmit the PUSCH by Semi Persistent Scheduling (SPS) and control power of the PUCCH channel transmitted by the corresponding cell.

In order to simplify free settings of the PUCCH transmission cell, the following method 2 may be used.

[Method 2] Mapping Between Downlink Carrier and Uplink Carrier for Each Terminal For frequency division duplexing (FDD), according to the LTE Release-8 to 11 specifications, each cell uses the SIB2 information to broadcast uplink carrier information corresponding to the downlink carrier in the cell. For Pcell, the terminal recognizes an uplink carrier of Pcell from the SIB2 information and recognizes a downlink carrier to the remaining Scell(s) and uplink carrier information corresponding to the downlink carrier through separate RRC signaling provided from the base station. However, as described above, the channel state may be different for each terminal. Thus, it is preferable to set connection information between an uplink carrier and a downlink carrier including Pcell for each terminal. That is, the base station uses terminal-specific RRC signaling to set, for each terminal, a connection between the downlink carrier and the uplink carrier with respect to cells set by the CA, including Pcell. In this case, the terminal may ignore carrier connection information of SIB2 and operate according to carrier connection information set through the RRC signaling. Using the above-described method, each terminal may be notified of the uplink carrier information of Pcell.

FIG. 4 is a conceptual diagram illustrating a method of mapping a downlink carrier and an uplink carrier.

Figure 4A:
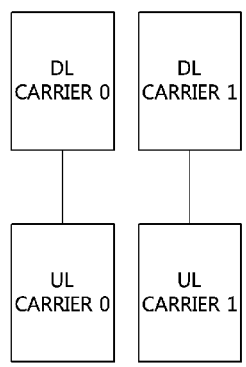
FIG. 4 is a conceptual diagram illustrating a method of mapping a downlink carrier and an uplink carrier.

FIG. 4A illustrates mapping between the downlink carrier and the uplink carrier for each cell by SIB2, and illustrates that a connection of the uplink carrier to each downlink carrier is set using the SIB2.

Figure 4B:
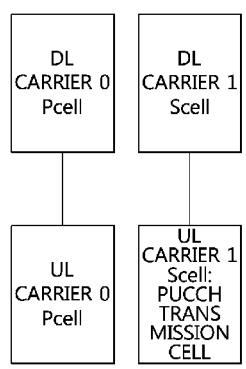

FIG. 4B illustrates a case in which Scell is set at the PUCCH transmission cell and shows an example in which Scell is set as the PUCCH transmission cell.

Figure 4C:
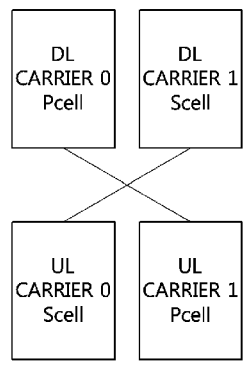

FIG. 4C illustrates mapping between the downlink carrier and the uplink carrier for each terminal. As illustrated in FIG. 4C, the base station sets mapping between a downlink carrier and an uplink carrier of Pcell and Scell for terminals through terminal-specific signaling, and the terminal uses the uplink carrier of Pcell to transmit the PUCCH. When the above-described method is used, Pcell is always maintained in an activation state, thereby applying contents of the legacy LTE Release-10/11 specification with no changes while a problem caused by deactivation does not occur. Meanwhile, the terminal for which the CA is not set may set the uplink of Pcell using separate RRC signaling. In this case, the terminal may ignore the uplink carrier information of the SIB2, and may use a carrier instructed by the RRC signaling as the uplink carrier.

How to Transmit PUCCH

In order to enable the terminal to transmit the PUCCH using Scell, the specification may be supplemented as follows.

The terminal should apply a Physical Cell Identity (PCI) of the PUCCH transmission cell or a Virtual Cell Identity determined by the base station when generating sequences in PUCCH formats 1, 1a/1b, 2, 2a, 2b, and 3. For PUCCH format 1a/1b in which a resource is mapped by an index of a control channel element (CCE) of the downlink PDCCH, when the PUCCH transmission cell supports legacy UEs, collision with the resource in PUCCH format 1a/1b of the legacy UEs may occur. This is because for the legacy terminal, the PUCCH resource is mapped to the uplink carrier connected with the downlink carrier according to SIB2 information. Accordingly, in order to avoid the collision, a resource offset of the PUCCH format 1a/1b may be set for each terminal. The setting of a virtual cell ID and the setting of a resource offset for each terminal in PUCCH format 1a/1b are supported by the LTE Release-11 specification.

In order to control power of uplink PUCCH, PUSCH, and SRS for each cell, the terminal should be aware of a reference downlink carrier to be used to estimate a path loss on the downlink. That is, the terminal should be aware of the downlink carrier corresponding to each uplink carrier in order to estimate the path loss to control uplink power. In general, a mapping relation between the uplink carrier and the downlink carrier to estimate the path loss may be different from the above-described mapping relation between the downlink carrier and the uplink carrier in the CA cell setting. This may require a separate signaling. For example, when a downlink signal of any one cell is transmitted in a macro cell site and an uplink signal is received in a small cell site, a downlink carrier in the small cell site should be used as the reference downlink carrier of the cell and thus the path loss may be accurately estimated. That is, the terminal should estimate the path loss using a signal transmitted at a position in which the uplink is received in order to estimate the path loss to control uplink power. For this, the base station should notify the terminal of information regarding the reference downlink carrier for estimating the uplink path loss for each cell. The reference downlink carrier information may include a frequency and bandwidth of the downlink carrier, Cell-specific Reference Signal (CRS) setting information (a physical layer cell ID, the number of CRS antenna ports, etc.), and CRS transmission power, specifically, energy per resource element (EPRE). Here, the base station may notify the terminal of CSI-Reference Signal (CSI-RS) setting information and a CSI-RS transmission power value, instead of the CRS setting information. The terminal estimates the downlink path loss of the reference carrier from the reference downlink carrier information. The estimated downlink path loss is used as an uplink path loss value for uplink open-loop power control.

How to Support Inter-Site CA Having Non-Ideal Backhaul.

A most general form of the CA may include intra-eNB CA and inter-eNB CA. Here, CA including the inter-eNB CA has time delay generated in communication between base stations and capacity limitation in communication lines, and thus it may be difficult for all cells grouped by the CA to perform dynamic scheduling through one central control. Accordingly, it is inefficient to apply a CA scheme in the LTE Release-10/11 that is based on the dynamic scheduling cooperation between the cells grouped by the CA with no changes.

Even in case of the intra-eNB CA, implementation may be achieved such that an instant dynamic scheduling cooperation between cells grouped by the CA is difficult.

Figure 5:
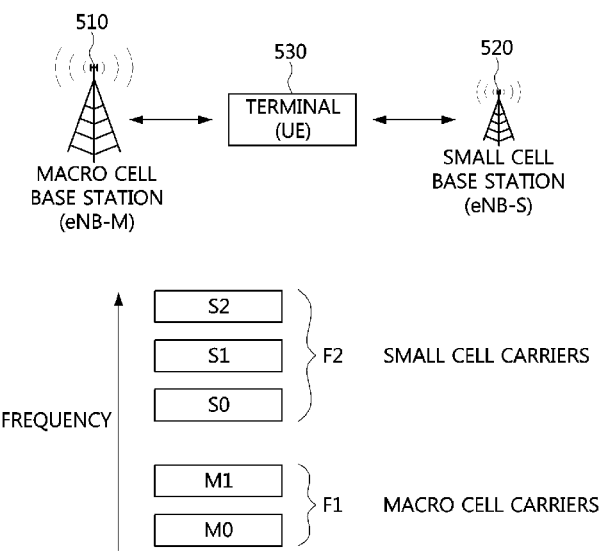
FIG. 5 is a conceptual diagram illustrating downlink frequency allocation of a terminal applying inter-eNB CA.

FIG. 5 is a conceptual diagram illustrating downlink frequency allocation of a terminal applying inter-eNB CA. FIG. 5 illustrates a case in which a base station managing a macro cell (a macro cell base station) 510 is different from a base station managing a small cell (a small cell base station) 520, and the CA is applied to a terminal 530 using the macro cell and the small cell. An implementation shown in FIG. 5 corresponds to a most typical form of the inter-eNB CA.

It is assumed below that a dynamic scheduling cooperation between cells is not accomplished because connectivity between the macro cell base station 510 and the small cell base station 520 of FIG. 5 is not ideal. In this case, when instant information exchange between the macro cell base station 510 and the small cell base station 520 is difficult and thus delay occurs in cooperation for PDSCH and PUSCH scheduling, there is a need to change the specification such that the two base stations 510 and 520 may perform PDSCH and PUSCH scheduling independently of each other. Specifically, it is preferable that the macro cell base station 510 receives Uplink Control Information (UCI) regarding cells managed by the macro cell base station 510 directly from the cells. In addition, it is preferable that the small cell base station 520 receives UCI regarding cells managed by the small cell base station 520 directly from the cells. In order to realize this, for example, the terminal 530 needs to consider that each of the macro cell and the small cell is set as Pcell. That is, the terminal is allowed to use a macro cell to transmit UCI corresponding to cells belonging to the macro cell base station 510 and to use a small cell to transmit UCI corresponding to cells belonging to the small cell base station 520.

Expansion of how to Set CA

A method of setting CA, in which CA is configured with cells that have difficulties in dynamic scheduling between the cells (for example, inter-eNB CA or intra-eNB CA having non-ideal backhaul connectivity between the cells) and efficiently applied to a terminal, will be described below.

The CA setting method to be described below is an integrated setting method that considers all of inter-eNB, intra-eNB, ideal backhaul, and non-ideal backhaul, and is not limited to implementation of any specific network.

[Cell Group Setting]

Cells that can perform a dynamic cooperation are grouped as one cell group. Carriers (or cells) managed by one eNB may be set as one cell group.

For example, as shown in FIG. 5, it is assumed that the terminal 530 is allocated macro cell carriers M0 and M1 and small cell carriers S0, S1, and S2. Here, the macro carriers M0 and M1 are managed by one base station (eNB-M) 510, and the small cell carriers S0, S1, and S2 are managed by another base station (eNB-S) 520. That is, the macro cell carriers and the small cell carriers are managed by different base stations. In addition, it is assumed that an instant dynamic scheduling cooperation is difficult in transfer of information between the base stations 510 and 520 due to the occurrence of certain delay. In this case, cells that are set by the CA for the terminal 530 may be classified into a set consisting of the macro cells and a set consisting of the small cells.

[Setting of Primary Cell Group and Secondary Cell Group(s), Setting of Primary Cell for Each Cell Group]

One of cell groups is set as a primary cell group, and the others may be set as a secondary cell group. One in each cell group is set as a primary cell, and the others may be set as secondary cells. Here, the primary cell in each cell group may perform a function similar to that of Pcell of the LTE Release-10/11 in each cell group.

For example, in FIG. 5, a set consisting of macro cells may be set as the primary cell group, and a set consisting of small cells may be set as the secondary cell group.

The above-described setting of the primary cell group, the secondary cell group, and the primary cell for each cell group may be performed for the terminal by the base station, using terminal-specific RRC signaling.

[Separation of Roles of Primary Cell Group and Secondary Cell Group]

In an application example of the intra-eNB CA shown in FIG. 3, in consideration of division of roles between a macro cell and a small cell, it is preferable that the macro cell functions to manage RRC connection state, mobility management, or the like of the terminal while maintaining cellular service coverage, and the small cell mainly serves to transmit and receive a large amount of data to and from the terminal. Considering this, the primary cell in the primary cell group may be allowed to serve to provide coverage of the terminal and manage mobility of the terminal, and the secondary cell group may be mainly used to transmit and receive data.

In terms of transmission of physical layer channels and signals, cell groups operate almost independently, and cells belonging to each of the cell groups operate similarly to the LTE Release-10/11. For example, the cells belonging to each cell group are allowed to operate as follows:

The cells belonging to each cell group transmit PDCCH/EPDCCH to schedule PDSCH or PUSCH for the cells belonging to each cell group.

Cross carrier scheduling may be applied between the cells belonging to each cell group.

The terminal transmits PUCCH using one of the cells belonging to each cell group. The PUCCH may be transmitted using a primary cell in each cell group similarly to that defined in the legacy LTE Release-10/11 or using a cell designated as the PUCCH transmission cell instead of the primary cell.

Similarly to the legacy LTE Release-10/11, the terminal gathers and transmits HARQ-ACK information regarding PDSCHs transmitted by the cells belonging to one cell group, through one PUCCH or one PUSCH at the same time. When the terminal transmits the HARQ-ACK using the PUCCH, the terminal may transmit the HARQ-ACK using a primary cell in the cell group (or a set PUCCH transmission cell). When the terminal transmits the HARQ-ACK using the PUSCH, the terminal may transmit the HARQ-ACK using one of the cells belonging to the cell group.

The reporting of CSI to the downlink may be performed for each cell group. That is, the cells for the CSI information (that is, for the CSI measurement) included in the CSI report that is transmitted using one PUCCH or PUSCH channel may include a cell or cells belonging to a cell group that includes a cell to which the CSI report is transmitted.

A scheduling request (SR) resource may be set for each cell group. That is, the terminal may be allocated the SR resource for each cell group. Depending on a reason why the terminal transmits the SR, it may be predetermined by a specification or base station setting that one of an SR resource in the primary cell group and an SR resource in the secondary cell group is used to transmit the SR.

Power headroom report is performed by transmitting power headroom for each cell group through a cell of the cell group.

Buffer Status Report (BSR) is performed by determining a cell group for the report according to characteristics of a logical channel and transmitting the report to the cell group.

The above-described operating method reflects a fact that the dynamic scheduling cooperation may be accomplished between cells belonging to the same base station but it is difficult that the dynamic scheduling cooperation is accomplished between cells belonging to different base stations. Considering signaling complexity and terminal complexity, it is preferable that the maximum number of cell groups is 2 or less. In the CA of the legacy LTE Rel-10/11, the number of cell groups is 1.

CA Setting and Cell Activation/Deactivation

The CA setting is allowed for a terminal with which RRC connection is established. Here, the CA setting denotes setting of a cell group and setting of a cell in the cell group. The cell used to establish RRC connection of the terminal is a primary cell in a primary cell group. The primary cell in the primary cell group is always activated. A scheme to be described below may be applied to activation/deactivation of the other cells. It is assumed that the activation/deactivation of the cells is dynamically delivered to the terminal using a MAC control element (CE) as defined in the LTE Release-10/11 specification.

[Method 1] the primary cell in the primary cell group is always activated. The other cells are activated by an activation command and deactivated by a deactivation command.

Method 1 allows deactivation of a primary cell in a secondary cell group. This causes the following problems.

Assuming that the cross carrier scheduling in a cell group is transmitted from a primary cell in the cell group, when the primary cell is deactivated, another cell should be designated as the primary cell. Accordingly, the primary cell is dynamically changed, and the dynamic change of the primary cell causes ambiguity to occur in PDCCH (or EPDCCH) monitoring of the terminal. This is because, while the primary cell is changed, the terminal and the base station may recognize different cells as the primary cell whose PDDCH (or EPDCCH) should be monitored by the terminal.

When the UCI in the cell group is transmitted using the primary cell, the dynamic change of the primary cell causes ambiguity to occur in a cell to which the UCI should be transmitted.

As described above, it is preferable that the following scheme is applied because ambiguity about the primary cell reduces system efficiency.

[Method 2] the primary cell in each cell group is always in an activation state. On the contrary, the remaining cells other than the primary cell among cells belonging to the cell group are activated by an activation command of an MAC CE transmitted by the base station, and deactivated by a deactivation command.

Since cell activation/deactivation is dynamically delivered to the terminal using the MAC CE, it is preferable that a base station that manages a cell group controls activation/deactivation of cells in the cell group.

Use of PDCCH/EPDCCH Common Search Space

It will be described below that the terminal monitors a PDCCH or EPDCCH region. According to the legacy LTE Release-10/11 specification, for a terminal for which the CA is set, there is a common search space of the PDCCH to be monitored by the terminal only in the primary cell (Pcell).

As shown in FIG. 5, a method in which a terminal for which inter-eNB CA between the macro cell base station and the small cell base station is set monitors a common search space of the macro cell and a common search space of the small cell will be described below in detail.

In response to the PDCCH (or EPDCCH) transmitted in the common search space, the terminal does not transmit a HARQ-ACK feedback. This is because information carried on the PDSCH scheduled by the following PDCCH is system information or control information for multiple terminals:

PDCCH (EPDCCH) and PDSCH set with SI-RNTI
PDCCH (EPDCCH) and PDSCH set with P-RNTI
PDCCH (EPDCCH) and PDSCH set with RA-RNTI.

For PDCCH (EPDCCH) and PDSCH set with System Information (SI)-Radio Network Temporary Identifier (RNTI), Paging (P)-RNTI, and Random Access (RA)-RNTI, a corresponding PDCCH (or EPDCCH) is transmitted in a common search space. In this case, a HARQ-ACK feedback of the terminal is not required. Accordingly, an additional scheduling limitation to be described below need not be applied to transmission of the PDCCH (EPDCCH) set with SI-RNTI, P-RNTI, or RA-RNTI. That is, resource division for avoiding simultaneous transmission of the PUCCH or UCI need not be applied to the PDCCH (EPDCCH) and PDSCH set with SI-RNTI, P-RNTI, or RA-RNTI.

Monitoring and Transmission of System Information for Each Cell Group

For the inter-eNB CA, since it is difficult that information exchange between base stations is instantly accomplished, a scheme in which each of the base stations itself transmits system information may be considered. In this case, a terminal for which the inter-eNB CA is set acquires system information (SI) of a macro cell group and system information (SI) of a small cell group from each cell group. Thus, the terminal should monitor the PDCCH (EPDCCH) set with the SI-RNTI and P-RNTI in a primary cell of a macro cell group. In secondary cells belonging to the macro cell group, as defined in the legacy LTE Release-10/11 specification, the base station delivers system information to the terminal through an RRC message for each terminal. Similarly, even in case of a small cell, the terminal monitors PDCCH (EPDCCH) set with SI-RNTI and P-RNTI in a primary cell in a small cell group, and secondary cells belonging to the small cell group receive system information through the RRC message for each terminal as defined in the LTE Release-10/11 specification.

If connection between the macro cells and the small cells has the non-ideal connectivity, the above-described scheme may be applied to even the intra-eNB CA.

In terms of a terminal, the terminal monitors transmission of the PDCCH (EPDCCH) set with the SI-RNTI and P-RNTI in a PDCCH (EPDCCH) common search space of a primary cell in each cell group.

Monitoring of Primary Cell in Primary Cell Group and Transmission of System Information to Remaining Cells In a method different from the above-described method, in consideration that the change of system information does not frequently occur, the terminal may be allowed to monitor the system information in only one cell, in even case of the Inter-eNB CA. In this case, in terms of a terminal, there is an advantage in which the terminal complexity is relatively low because the terminal monitors system information of only one cell.

For example, the terminal may be allowed to monitor the PDCCH (EPDCCH) set with the SI-RNTI and P-RNTI in only a primary cell of a primary cell group. That is, the terminal monitors a PDCCH (EPDCCH) common search space of the primary cell of the primary cell group. The base station may deliver system information of remaining cells that is set for a terminal to the terminal using an RRC message for each terminal.

Monitoring of Common Search Space for Uplink Power Control

In the legacy LTE Release-10/11 specification, Downlink Control Information (DCI) format 3/3A is transmitted in only a PDCCH common search space of Pcell. However, it is preferable that uplink power control of a terminal for which the inter-eNB CA between the macro cell base station and the small cell base station is set allows the macro cell and the small cell to perform independent power control. Thus, the macro cell and the small cell may have to use and transmit a DCI formats 3/3A delivering power control commands of the PUCCH and PUSCH to the terminal. That is, the DCI format 3/3A may be transmitted in a common search space of the macro cell and a common search space of the small cell. The terminal is allowed to monitor the DCI format 3/3A in a primary cell common search space of each cell group. The power control by the DCI format 3/3A is applied to PUSCH/PUCCH power control of a cell group to which a cell used for DCI transmission belongs.

Alternatively, when only primary cell group allows Semi-persistent Scheduling (SPS) transmission, in consideration that the uplink power control by the DCI format 3/3A is mainly used for PUSCH power control scheduled in an SPS form, the terminal may be allowed to monitor the DCI format 3/3A in only the primary cell common search space of the primary cell group. When the terminal receives the DCI format 3/3A transmitted in the primary cell common search space of the primary cell group, a corresponding power control command is applied to PUSCH/PUCCH power control of cells belonging to the primary cell group of the terminal.

For Physical Hybrid-ARQ Indicator Channel (PHICH), a PHICH corresponding to the PUSCH scheduled by the PDCCH/EPDCCH is transmitted in a cell to which the PDCCH/EPDCCH carrying uplink scheduling information is transmitted. The PHICH delivers, to the terminal, downlink HARQ-ACK information for the PUSCH transmission of the terminal.

For Physical Control Format Indicator Channel (PCFICH), the terminal should detect the PCFICH from a primary cell in each of the macro cell group and the small cell group. That is, the terminal detects the PCFICH of the primary cell in each cell group. In a cell scheduled by cross carrier scheduling, the base station uses RRC signaling to notify the terminal of a position of a PDSCH start symbol of the cell.

Uplink Resource Division for Inter-Site CA Having Non-Ideal Backhaul

It is preferable that a cell used for PUCCH transmission is determined in consideration of power consumption and PUCCH reception quality of the terminal. For this, the base station may designate an uplink carrier to be used for the terminal to transmit the PUCCH for each cell group.

The following process may be needed to determine the cell used for the PUCCH transmission.

The terminal searches for a cell search signal or cell discovery signal that is transmitted by each cell and reports a measurement result to a primary cell group. The base station that has received a measurement result report from the terminal configures a cell group on the basis of the measurement result of the terminal, and the terminal determines a cell to be used for the terminal to transmit the PUCCH in each cell group to set a cell group for each terminal, a primary cell for each cell group, a PUCCH transmission cell, or the like. That is, the base station may set changes of the cell group, the primary cell, and the PUCCH transmission cell for the terminal on the basis of the measurement result of the terminal.

When a plurality of cell groups are set for the terminal, one PUCCH may be transmitted to each cell group. Thus PUCCHs equal to the maximum number of cell groups can be transmitted at the same time. However, since the maximum power that may be used by the terminal is limited, there may be a need to avoid simultaneously transmitting the plurality of PUCCHs in the same subframe in order to secure reception quality of the PUCCH according to a channel environment of the terminal.

PUCCH Transmission Form

In a terminal for which two cell groups of cell group 1 and cell group 2 are set, the PUCCH transmission may be classified as shown in Table 3. In Table 3, PUCCH_1 denotes a PUCCH channel for cell group 1, and PUCCH_2 denotes a PUCCH channel for cell group 2.

TABLE 3

|  | PUCCH transmission form | Notes |
|---|---|---|
| Case A | PUCCH_1 or PUCCH_2 | Disallow simultaneous transmission |
| Case B | PUCCH_1, PUCCH_2, or (PUCCH_1 + PUCCH_2) | Allow simultaneous transmission |

[Case A] The PUCCH of cell group 1 (PUCCH_1) is transmitted using a primary cell of cell group 1 or a designated cell, or the PUCCH of cell group 2 (PUCCH_2) is transmitted using a primary cell of cell group 2 or a designated cell. However, PUCCH_1 and PUCCH_2 are not allowed to be simultaneously transmitted in the same frame.

[Case B] The PUCCH of cell group 1 (PUCCH_1) is transmitted using a primary cell of cell group 1 or a designated cell, or the PUCCH of cell group 2 (PUCCH_2) is transmitted using a primary cell of cell group 2 or a designated cell. However, the two PUCCHs (that is, PUCCH_1 and PUCCH_2) are allowed to be simultaneously transmitted in the same frame.

The base station delivers, to each terminal, an instruction regarding which of PUCCH transmission forms is to be chosen by the terminal. The terminal performs PUCCH transmission according to the PUCCH transmission form instructed by the base station.

For example, on a condition that cell group 1 corresponds to the macro cells and cell group 2 corresponds to the small cells, [Case A] may be applied to a terminal having low path losses with respect to both the macro cells and the small cells. On the contrary, for a terminal having high path losses with respect to at least one of the cells, if it is difficult to secure power sufficient to perform simultaneous transmission of PUCCH to two cells, it is preferable to apply [Case B].

The base station may receive a downlink measurement result report for the macro cells and the small cells from the terminal, estimate a path loss from the received downlink measurement result, and determine which of [Case A] and [Case B] to apply. Alternatively, it is preferable that the terminal reports information about power headroom to the base station such that the base station may be aware of power actually used by the terminal. That is, the terminal reports, to the base station, power headroom information that is calculated using PUCCH power control setting parameters set for each cell for which the CA is set. The terminal may be allowed to report the power headroom report through a cell in a primary cell group. A base station that manages the primary cell group may be allowed to determine the PUCCH transmission form on the basis of the received power headroom information.

The following forms may be used as a method of reporting the power headroom:

Uplink power headroom for a serving cell used for PUCCH transmission of cell group 1 when it is assumed that the PUCCH is transmitted to cell group 1;

Uplink power headroom for a serving cell used for PUCCH transmission of cell group 2 when it is assumed that the PUCCH is transmitted to cell group 2;

Uplink power headroom for a serving cell used for PUCCH transmission of cell group 1 when it is assumed that the PUCCH is simultaneously transmitted to cell group 1 and cell group 2; and Uplink power headroom for a serving cell used for PUCCH transmission of cell group 2 when it is assumed that the PUCCH is simultaneously transmitted to cell group 2 and cell group 2.

In [Case A], when transmission requests for PUCCH_1 and PUCCH_2 simultaneously occur in the same subframe, the terminal may not transmit PUCCH_1 or PUCCH_2 according to a priority in order to maintain the transmission form of [Case A]. For example, when PUCCH_1 has a high priority than PUCCH_2, the terminal may not transmit PUCCH_2 but only PUCCH_1.

A method of control power and a method of temporally dividing resources according to the uplink PUCCH transmission form will be described below.

An upper limit of maximum uplink power to be used for each cell group is previously set such that transmission power of the terminal does not excess allowable maximum transmission power even when the terminal simultaneously transmits the PUCCH to two or more cell groups, and the cell group autonomously controls power within the set range. This scheme previously causes a certain decrease in the maximum power to be used by each cell group and thus may be applied to a terminal with the performance that is not limited by power limitation. On the contrary, it is not preferable to apply the above scheme to a terminal that does not secure sufficient reception power for at least one of the two cell groups.

The cell groups may temporally divide and use uplink resources used for UCI transmission of the terminal. In particular, this method is suitable to be applied to a terminal not having power sufficient to simultaneously transmit the UCI to two or more cell groups. For example, for PDSCH scheduling that requests HARQ-ACK transmission, when downlink PDSCH scheduling is temporally divided and used between the cell groups, the uplink HARQ-ACK transmission does not occur simultaneously in cell groups. As such, when a scheduling constraint that occurs according to resource division is considered, this method has an advantage in that the method can be effectively used for traffic load balancing between the cell groups, but may not obtain significant enhancement in data transmission/reception rate in terms of one terminal.

Information, Channel, and Signal to which Temporal Division of Transmission Resources is Applied When the terminal is connected to both the macro cell and the small cell, it is very important to allow the cells connected with the terminal to stably receive UCI. For example, there may be a case in which reception quality of UCI is reduced because of large interference or insufficient terminal power, and the occurrence of the case needs to be minimized. When the terminal may provide a stable reception power level of UCI to both the macro cell and the small cell although simultaneously transmitting the UCI to the macro cell and the small cell, PUSCH or PUCCH carrying UCI of the macro cell and PUSCH or PUCCH carrying UCI of the small cell may be allowed to be simultaneously transmitted in the same subframe.

On a condition that the terminal simultaneously transmits the UCI to the macro cell and the small cell, when a sufficient reception power level is not provided to at least one of the two cells, it is preferable that the UCI of the macro cell and the UCI of the small cell are transmitted in different subframes. For [Case A] of the above-described PUCCH transmission form, since an instant cooperation between two base stations is difficult, uplink resources need to be divided between cell groups and used in order to limit PUCCH simultaneous transmission according to a channel situation of the terminal. The resource division between cell groups needs to be applied to SRS transmitted by the terminal, in addition to the UCI.

Uplink information and signals to which the uplink resource division is applied are as follows:
Uplink HARQ-ACK: ACK or NACK information, which is a downlink PDSCH decoding result;
CSI: channel state information regarding downlink channel;
SR: scheduling request information; and
SRS: reference signal for acquiring uplink channel quality.

Since the PDSCH scheduled in the PDCCH and EPDCCH set with the C-RNTI and the SPS C-RNTI requests an uplink HARQ-ACK feedback of the terminal, applying temporal division to the uplink HARQ-ACK information denotes applying the temporal resource division to the PDSCH scheduled by the PDCCH and EPDCCH set with the C-RNTI and the SPS C-RNTI. For example, when the PDSCH transmission occurs in subframe n, an uplink HARQ-ACK corresponding thereto is transmitted in subframe n+4 for FDD. Accordingly, in order for the HARQ-ACK information in the macro cell group and the small cell group not to occur in the same subframe, downlink PDSCH transmissions should not occur in the same downlink subframe, either. That is, the downlink subframes used by two cell groups should not overlap each other. When it is difficult that a scheduling cooperation between the two cell groups is instantly accomplished, downlink subframes to be used for PDSCH transmission by the macro cell group and downlink subframes to be used for PDSCH transmission by the small cell group may be predetermined, and each cell group may be configured to use its predetermined subframes.

On the contrary, the temporal resource division may not be applied to the PUSCH carrying UL-SCH that is scheduled in the PDCCH and EPDCCH set with the C-RNTI and SPS C-RNTI. The UL-SCH may perform suitable link adaptation even when the UL-SCH is simultaneously transmitted in the same subframe as other channels. Thus, the UL-SCH may apply HARQ to perform retransmission even when a reception failure occurs in the base station.

Meanwhile, when the terminal is aware of downlink subframes usable for each cell group, the monitoring of the PDCCH and EPDCCH may be simplified. Thus, it is preferable that information regarding the downlink subframes usable for each cell group is delivered to the terminal.

Table 4 shows a limitation form for simultaneous transmission of UCI.

TABLE 4

| Cell group 1 | Cell group 2 | Whether to allow simultaneous transmission |
| --- | --- | --- |
| PUCCH | PUCCH | Disallowed |
| PUCCH | PUSCH without UCI | Allowed |
| PUCCH | PUSCH with UCI | Disallowed |
| PUSCH with UCI | PUCCH | Disallowed |
| PUSCH with UCI | PUSCH without UCI | Allowed |
| PUSCH with UCI | PUSCH with UCI | Disallowed |
| PUSCH without UCI | PUCCH | Allowed |
| PUSCH without UCI | PUSCH without UCI | Allowed |
| PUSCH without UCI | PUSCH with UCI | Allowed |

As shown in Table 4, when it is assumed that cell group 1 and cell group 2 avoid simultaneously transmitting the UCI in the same subframe, a limitation is applied to PDSCH scheduling. However, the limitation does not need to be applied to the PUSCH scheduling for transmitting the UL-SCH. The UL-SCH may perform suitable link adaptation even when the UL-SCH is simultaneously transmitted in the same subframe as other channels. Thus, the UL-SCH may apply HARQ to perform retransmission even when a reception failure occurs in the base station. In order to apply simultaneous transmission limitation of the UCI between the cell groups, subframes in which the UCI is transmitted should not temporally overlap each other between cell groups. Thus, each cell group needs to predetermine and use subframes to be used for UCI transmission of the terminal.

For aperiodic CSI among UCI, when a request for an aperiodic CSI report occurs in downlink subframe n, the aperiodic CSI report corresponding thereto is transmitted in uplink subframe n+4 for FDD using the PUSCH. In order for the terminal not to simultaneously transmit the aperiodic CSI report to two or more cell groups, subframes in which the aperiodic CSI report request may be transmitted may be configured to be shared between the cell groups. Here, in order for the aperiodic CSI report of one cell group and uplink HARQ-ACK transmission of another cell group not to occur in the same uplink subframe, a subframe in which the aperiodic CSI report request of the cell group occurs should be different from that in which PDSCH transmission of the other cell group occurs (here, the PDSCH denotes the PDSCH that requests an uplink HARQ-ACK). Accordingly, in order for an aperiodic CSI report or uplink HARQ-ACK transmission of one cell group and an aperiodic CSI report or HARQ-ACK transmission of another cell group not to occur in the same subframe, subframes in which the aperiodic CSI report request and the PDSCH transmission may occur should be shared between the two cell groups without overlap.

Even for SRS transmission, in order to avoid simultaneously transmitting SRS-UCI between the cell groups, each cell group should perform SRS transmission using some of subframes in which the UCI that may be used for the cell group can be transmitted.

Dropping of Transmission of UCI or PUCCH According to Priority

A method of dropping transmission of PUCCH, UCI, and SRS according to a priority in order to prohibit simultaneous transmission of the PUCCH, UCI, and SRS will be described below.

Method of dropping transmission of PUCCH according to priority: a terminal for which PUCCH simultaneous transmission is not set determines PUCCH to be transmitted according to the priority when a collision occurs in the PUCCH transmission. That is, the terminal transmits PUCCH having a highest priority and drops transmission of (that is, does not transmit) PUCCH having a low priority. The priority may be determined preferentially in consideration of a cell group index. For example, the PUCCH having a lower cell group index may be given a higher priority.

Method of dropping transmission of UCI according to priority: transmission of UCI may use the PUSCH or PUCCH. Here, irrespective of which channel is used to transmit the UCI, UCI simultaneous transmission is prohibited from occurring between the cell groups. The terminal for which the UCI simultaneous transmission is not set determines UCI to be transmitted according to the priority when a collision occurs in the UCI transmission. That is, the terminal transmits UCI having a highest priority and drops transmission of (that is, does not transmit) UCI having a low priority. The priority may be determined preferentially in consideration of a cell group index. For example, the UCI having a lower cell group index may be given a higher priority.

Method of dropping transmission of SRS according to priority: a terminal for which SRS simultaneous transmission is not set determines an SRS to be transmitted according to the priority when a collision occurs in the SRS transmission.

That is, the terminal transmits an SRS having a highest priority and drops transmission of (that is, does not transmit) an SRS having a low priority. The priority may be determined preferentially in consideration of a cell group index. For example, the SRS having a lower cell group index may be given a higher priority.

Detailed Method of Temporally Dividing Resources

A scheme similar to resource division of access link and relay backhaul introduced in the LTE Release-10 specification may be used to temporally divide uplink resources used by the cell groups. Alternatively, an Almost Blank Subframe (ABS) scheme in the LTE Release-10 specification may be considered. It should be noted that in the existing resource division of the access link and the relay backhaul or the ABS type resource division is a scheme in which resources in the same carrier are divided, but resource division to be described below is a scheme in which resources in different carriers are divided temporally. A reason why the temporal resource division is applied is to prevent degradation of reception performance of the PUCCH or UCI according to the simultaneous transmission.

In order to temporally divide the uplink, downlink PDSCH transmission that requests the HARQ-ACK feedback should be divided temporally. For this, the temporal resource division to be described below may be considered.

Method 1: the collision between the uplink HARQ-ACK transmission and the PUSCH transmission may be avoided when uplink HARQ-ACK transmission should be performed at intervals of 8 ms to have a different temporal offset for each cell group in consideration that a Round Trip Time (RTT) of downlink HARQ process is 8 ms. The RTT of the downlink HARQ process is fixed as 8 ms, and the downlink HARQ process may be allowed to be shared between the cell groups. For example, cell group 1 may be allowed to use a zeroth downlink HARQ process, and cell group 2 may be allowed to use other HARQ processes, that is, first to seventh HARQ processes. The above-described HARQ process use information should be notified in advance to a base station that manages cell group 1 and a base station that manages cell group 2 through information exchange or the like.

Method 2: when the collision between the uplink HARQ-ACK transmission and the PUSCH transmission is not considered, the downlink subframes may be shared between the cell groups. For example, for FDD, each cell group uses a bitmap consisting of 40 bits to indicate, by 0 or 1, whether to transmit the PDSCH to 40 continuous subframes. The information should be notified in advance to a base station that manages each cell group through the information exchange or the like.

Need to signal terminal: In inter-eNB CA, information regarding the use details of the temporal resource division should be exchanged between the base stations. Each base station applies a limitation to scheduling according to the information regarding the use details of the temporal resources division. The base station may transmit the resource division use details to the terminal. The terminal may acquire the information regarding the temporal resource division use and reduce the number of blind decodings by performing monitoring of the PDCCH/EPDCCH on the basis of the acquired information. Accordingly, it is preferable that the base station transmits the above-described temporal resource allocation information to the terminal.

Support of Dual Connectivity

Method of Supporting Dual Connectivity in a Co-Channel Arrangement of Macro Cells and Small Cells Consider a co-channel cell arrangement in which the macro cells and the small cells use the same carrier.

In general, when a terminal is placed within a region of a small cell, it may be difficult that the terminal receives a signal transmitted from the macro cell due to a signal of the small cell having a relatively higher strength than that of the macro cell.

Accordingly, in order for the terminal to always maintain connection to a macro cell layer, an appropriate method is required to receive a signal of the macro cell even in the small cell region.

Cell Arrangement Structure Using the Same Cell ID

In the above-described method for enhancing the small cell, a case in which each of the macro cell and the small cell is formed as an independent cell (that is, a cell having an independent cell ID) has been mainly described. However, as in CoMP scenario 4 of the LTE Release-11 specification, a high-power transmission point and low-power transmission points that are geographically adjacent to one another may form the same cell. In this case, the high-power transmission point and the low-power transmission points that belong to the same cell may be regarded as sharing the same cell ID. As such, when a plurality of transmission points that are geographically adjacent to one another form the same cell, one or more transmission points may participate in transmitting a CRS corresponding to a physical layer cell ID of the cell. Here, the transmission points participating in transmitting the CRS should use the same CRS sequence, use the same wireless resources, and perform simultaneous transmission. That is, the transmission points should transmit the same CRS sequence value in CRS transmission resources.

A channel or transmission method that requires channel estimation to be performed using the CRS when the terminal performs decoding is referred to as a CRS-based channel method or a CRS-based transmission method. A channel or transmission method that requires channel estimation to be performed using the DM RS when the terminal performs decoding is referred to as a DM RS-based channel method or a DM RS-based transmission method.

Consider a case in which a high-power transmission point and low-power transmission points are disposed at different positions in a cell (see FIG. 7), and the transmission points use the same carrier frequency. Here, considering a case in which the high-power transmission point and at least one of the low-power transmission points transmit the same CRS sequence using the same time-frequency resource, the CRS-based transmission is always performed using at least two transmission points. As in CoMP scenario 4 of the LTE Release-11 specification, when the high-power transmission point and the low-power transmission points are connected via ideal backhaul, the terminal may always receive CRS-based channels that are simultaneously transmitted from the high-power transmission point and the low-power transmission points by using the above-described scheme. A terminal having CoMP reception capability can receive DM RS-based channels transmitted from the high-power transmission point, transmitted from the low-power transmission point, or simultaneously transmitted from both the high-power transmission point and the low-power transmission point. Accordingly, when the high-power transmission point and the low-power transmission points are connected via ideal backhaul, dual connectivity to the high-power transmission point and the low-power transmission point may be supported for both of a terminal having CoMP reception capability and a terminal not having the CoMP reception capability.

On the contrary, when the high-power transmission point and the low-power transmission point are connected via non-ideal backhaul, it is difficult that a scheduling cooperation between the high-power transmission point and the low-power transmission point is instantly accomplished. Thus, it is difficult that the two transmission points simultaneously perform CRS transmission based on the same cell ID and CRS-based transmission. This is because it is difficult that, in a non-ideal backhaul-based cooperation in which time delay is high when information is exchanged between the two transmission points, the two transmission points instantly share scheduling information varying dynamically and simultaneously transmit CRS-based channels, such as PDCCH, PDSCH, PCFICH, PHICH or the like using the same resource. Accordingly, when the high-power transmission point and the low-power transmission point are connected via non-ideal backhaul, it is preferable that only the high-power transmission point is allowed to perform CRS transmission and CRS-based transmission. That is, only the high-power transmission point is allowed to perform the CRS transmission and the CRS-based transmission. Here, the CRS-based transmission is transmission in which the terminal performs decoding with the CRS. Channels such as PCFICH, PHICH, and PDCCH are transmitted through the CRS-based transmission, and the PDSCH transmission may be the CRS-based transmission depending on the transmission format. The high-power transmission point may perform DM RS-based transmission. The PDSCH transmission may be the DM RS-based transmission depending on the transmission format.

Meanwhile, the low-power transmission point should not perform the CRS-based transmission because the low-power transmission point does not transmit the CRS. On the contrary, the low-power transmission point may perform DM RS-based transmission. By using the above-described scheme, the terminal may always maintain connectivity with the high-power transmission point and may generate connection with the low-power transmission point around the terminal according to a position of the terminal. Accordingly, the terminal included in a low-power transmission point region may be allowed to have dual connectivity to the high-power transmission point and the low-power transmission point.

Figure 6:
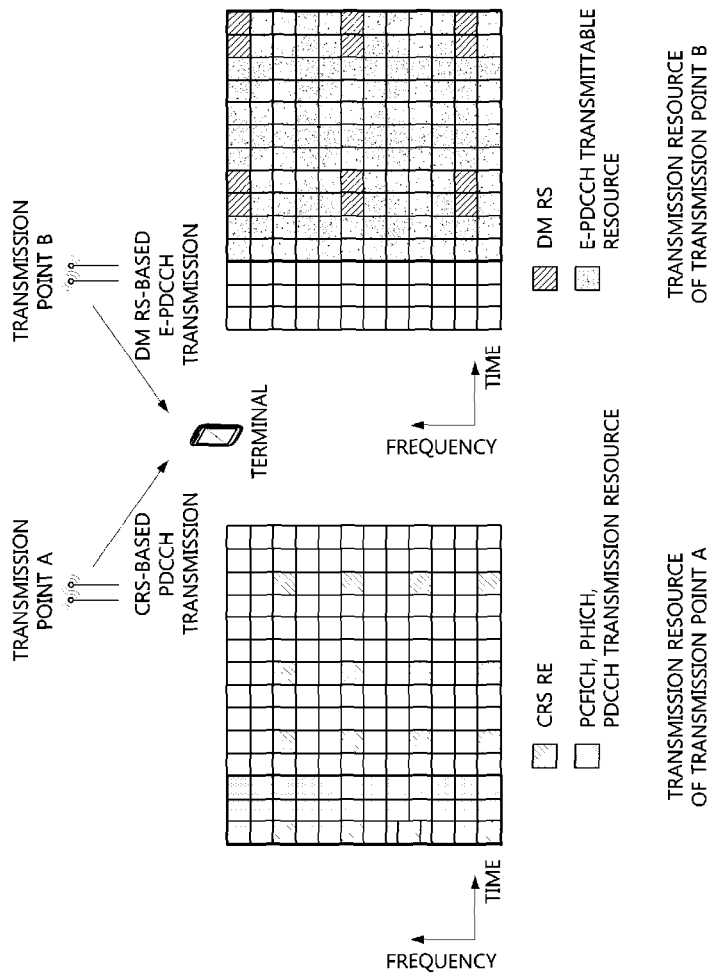
FIG. 6 is a conceptual diagram illustrating an example in which two transmission points sharing a cell ID use a downlink transmission resource.

FIG. 6 is a conceptual diagram illustrating an example in which two transmission points sharing a cell ID use a downlink transmission resource.

FIG. 6 assumes that transmission point A and transmission point B use the same cell ID and shows PDCCH and EPDCCH transmission resources for the terminal when the terminal is served by two transmission points. FIG. 6 assumes that transmission point A uses two CRS antenna ports (antenna ports 0 and 1), transmission point B uses two DM RS antenna ports (antenna ports 17 and 18), and transmission point A has a control channel transmission region corresponding to three OFDM symbols. In FIG. 6, the terminal may use first three OFDM symbols in the subframe to receive PCFICH, PHICH, and PDCCH which are CRS-based channels form transmission point A and receive EPDCCH that is a DM RS-based channel from transmission point B. In case of the EPDCCH, the terminal may receive EPDCCH from transmission point A.

In FIG. 6, when information about a size of the control channel transmission region of the transmission point A is shared between transmission point A and transmission point B, transmission point B may be aware of a position of a starting OFDM symbol of the EPDCCH or PDSCH and may more efficiently use resources using the position.

Meanwhile, the terminal receives PDCCH or EPDCCH and checks whether to schedule PDSCH through the received control channel. When the PDSCH is scheduled for the terminal, the terminal receives the scheduled PDSCH to perform decoding, and then transmit HARQ-ACK information, which is a result of the decoding, using PUCCH. Here, since the transmission points cannot instantly perform information exchange, it is preferable that HARQ-ACK feedback from the terminal in response to downlink PDSCH transmission may be transmitted to the transmission point that has transmitted the PDSCH. That is, the terminal transmits the HARQ-ACK information about the PDSCH transmission scheduled by CRS-based PDCCH transmitted by the high-power transmission point by performing uplink power control in consideration of the high-power transmission point as a reception point. For HARQ-ACK information about DM RS-based PDSCH transmission transmitted by the low-power transmission point, it is preferable to perform uplink power control in consideration of the low-power transmission point as the reception point. Similarly, for HARQ-ACK information about DM RS-based PDSCH transmission transmitted by the high-power transmission point, it is preferable to perform uplink power control in consideration of the high-power transmission point as the reception point.

The terminal receives PDCCH or EPDCCH and checks whether scheduling of PUSCH is approved through the received control channel. When the PUSCH is scheduled for the terminal, it is preferable that, when the terminal transmits the scheduled PUSCH, the terminal performs uplink power control in consideration of the transmission point that has transmitted the PDCCH or EPDCCH as the reception point.

As described above, in order to perform independent power control on two or more different reception points, a power control process corresponding to each reception point should be introduced. That is, separate uplink power control for PUSCH, PUCCH, and SRS should be accomplished for each reception point.

The uplink power control may be divided into an open-loop part and a closed-loop part. The terminal estimates a path loss to perform the open-loop power control. Since the estimation of the uplink path loss may vary depending on the reception point, the base station should notify the terminal of an appropriate reference signal needed to estimate the path loss and transmission power of the reference signal. For an uplink channel in which the high-power transmission point is considered as the reception point, the high-power transmission point performs CRS-based transmission. Thus, the terminal may acquire the transmission power of the CRS transmitted by the high-power transmission point to estimate the path loss. For an uplink channel in which the low-power transmission point is considered as the reception point, the low-power transmission point performs only DM RS-based transmission. Thus, in order to estimate the path loss, it is preferable that the base station may notify the terminal of CSI-RS setting information and transmission power that are transmitted by the low-power transmission point and thus allow the terminal to estimate the path loss. The terminal may compare a transmission power value of a signal with a reception power value to estimate a downlink path loss and then assume the estimated downlink path loss as an uplink path loss.

Cell Arrangement Structure Using Different Cell IDs

A method of supporting dual connectivity in a cell arrangement structure using different cell IDs will be described below. Similarly to CoMP scenario 3 of the legacy LTE Release-11, consider a case in which a high-power transmission point forms a macro cell while a low-power transmission point in the macro cell forms a small cell having a different cell ID from the macro cell. In order for a terminal located in the small cell region to maintain connection with the macro cell, there is a need for the macro cell and the small cell to use resources divided without overlap. That is, when a resource used by the macro cell is not used by the small cell, and a resource used by the small cell is not used by the macro cell, there is no interference between the two cells. Thus the terminal may adequately receive a signal transmitted from one of the two cells. For the CRS-based channel, only when the terminal is aware of which cell participates in the transmission, the terminal may estimate a channel from the CRS of the cell to decode a CRS-based channel. For the DM RS-based transmission, the terminal need not necessarily be aware of which cell participates in the transmission. However, when the terminal is aware of a cell participating in the transmission and the CRS of the cell, there is an advantage in that PDSCH decoding performance may be increased. When connection between the high-power transmission point and the low-power transmission point is non-ideal, in terms of uplink power control, it is preferable that the terminal performs appropriate uplink power control in consideration of a transmission cell as a reception cell according to which cell is the transmission cell.

When the terminal monitors PDCCH/EPDCCH, there may be a need for separate monitoring of each cell according to cell IDs of the macro cell and the small cell. Considering complexity of the terminal, it is preferable that only a search space of one of the two cells is monitored. Considering a role of the macro cell in dual connectivity, it is preferable that PDCCH (or EPDCCH) transmitted from the macro cell be monitored in a common search space while PDCCH (or EPDCCH) transmitted by a macro call or small cell, which is designated depending on a position and a channel environment of the terminal, is monitored in a terminal-specific search space.

Figure 7:
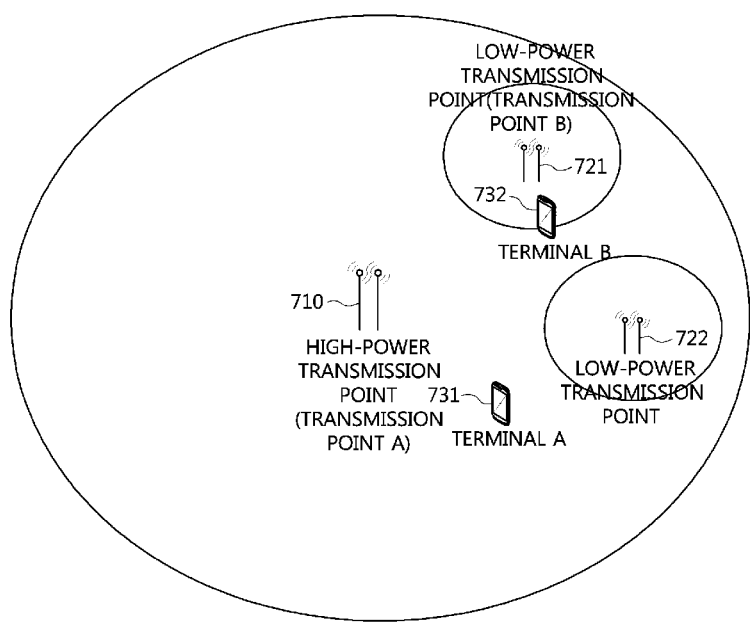
FIG. 7 illustrates an arrangement of a high-power transmission point and low-power transmission points.

FIG. 7 illustrates an arrangement of a high-power transmission point and low-power transmission points. FIG. 7 assumes that a high-power transmission point 710 forms a macro cell, low-power transmission points 721 and 722 form small cells, and the macro cell and the small cells 721 and 722 use the same carrier. Table 5 shows a method of monitoring search spaces of terminals 731 and 732 in the cell arrangement as shown in FIG. 7.

When the two terminals (terminal A and terminal B) 731 and 732 are located in the cell arrangement environment shown in FIG. 7, as shown in Table 5, the terminals 731 and 732 may be set to always monitor a common search space of the macro cell and to monitor a terminal-specific search space of the macro cell or the small cell according to the channel environment of the terminal.

TABLE 5

| | Common Search Space | UE-specific Search Space |
|---|---|---|
| Terminal A | Macro cell | Small cell |
| Terminal B | Macro cell | Small cell |

When the terminal is located near a transmission point of any small cell, signal strength of PBCH and Primary Synchronization Signal (PSS)/Secondary Synchronization Signal (SSS) of the small cell is great, which acts as significant interference to the channel and signal of the macro cell. In order to avoid such interference, radio frame transmission times of the macro cell and the small cell need to be different from each other such that a time period during which PBCH and PSS/SSS of the macro cell are transmitted does not overlap a time period during which PBCH and PSS/SSS of the small cell are transmitted. For example, the PBCHs and PSSs/SSSs may not overlap by a time difference in subframes between radio frame start times of the two cells.

Meanwhile, on a condition that the terminal has an interference cancellation function, although time periods during which PBCH and PSS/SSS are transmitted overlap each other, a problem of interference in PBCH and PSS/SSS may be solved with a technique of receiving PBCH and PSS/SSS that cause interference, performing estimation, and then canceling out a corresponding channel part in a received signal.

FIG. 8 illustrates a control channel resource division method of two transmission points that use different cell IDs.

FIG. 8 illustrates PDCCH and EPDCCH transmission resources for a terminal when transmission point A and transmission point B use different cell IDs and the terminal is served by the two transmission points. FIG. 8 assumes that transmission point A forms a macro cell, transmission point B forms a small cell, and each of transmission points A and B uses two CRS antenna ports (antenna ports 0 and 1) and has a control channel transmission region corresponding to three OFDM symbols.

Since the control channel transmission regions of the two transmission points overlap each other, there is a significant amount of interference between the two transmission points. As a solution of resolving the interference, a method of temporally separating control channel resources such that two transmission points use different control channel resources. However, although the control channels are temporally separated and then used, CRS should be always transmitted. Thus, there is a problem in that mutual interference caused by CRSs of the two transmission points cannot be avoided. On a condition that the terminal has a function of performing interference cancellation of CRS, the CRS interference problem may be solved with a technique in which the terminal receives a CRS giving strong interference, performs estimation, and then performs subtraction from a received signal.

As described above, for the CRS-based PDCCH transmission, only when the terminal is aware of which cell participates in the transmission, the terminal may estimate a channel from the CRS of the cell to monitor PDCCH and perform decoding. Accordingly, the base station should notify in advance the terminal of information needed for PDCCH monitoring through signaling. For the DM RS-based EPDCCH transmission, the base station should notify in advance the terminal of setting information needed for EPDCCH monitoring through signaling.

Uplink Transmission

Uplink PUCCH transmission needs to use PUCCH resources belonging to different resource blocks (RBs) when reception points are different. This is because PUCCH has a structure in which several terminals are multiplexed in the same resource block and therefore the uplink power control is accomplished by maintaining the same or similar reception power of PUCCHs that use the same resource block in the reception points. If PUCCHs having different reception points are multiplexed in the same resource block, a near-far problem may be caused by a difference between the reception points, and thus it may be difficult to maintain the same or similar reception power of the PUCCHs, thereby resulting in a problem of reducing PUCCH reception quality. In order to avoid this problem, the PUCCH channels having different reception points may have to be set to be transmitted using different resource blocks. In other words, the PUCCH resources can be set independently for each reception point.

Similarly to those described above for inter-site CA, an instant information exchange between reception points connected via non-ideal backhaul is difficult. Thus, UCI or the like should be transmitted separately for each reception point, and independent setting of resources and parameters should be enabled for each reception point. Uplink information and signals that need an independent setting for each reception point are as follows:

Uplink HARQ-ACK: ACK/NACK information, which is a downlink PDSCH decoding result;
CSI: Channel state information regarding downlink channel;
SR: Scheduling request information; and
Sounding RS (SRS): Reference signal for acquiring uplink channel quality.

In order to perform power control in consideration of two or more reception points, a power control process corresponding to each reception point should be introduced. In other words, separate uplink power control for PUSCH, PUCCH, and SRS should be accomplished for each reception point.

As described above, the uplink power control may be divided into an open-loop part and a closed-loop part. The terminal estimates an uplink path loss to perform the open-loop power control. Since the estimation of the uplink path loss may vary depending on the reception point, the base station should notify the terminal of a reference signal needed to estimate the path loss and transmission power of the reference signal. When the high-power transmission point is considered as the reception point, the high-power transmission point performs CRS-based transmission. Thus, the terminal may acquire the transmission power of the CRS to estimate the path loss. When the low-power transmission point is considered as the reception point, in order to estimate the path loss of the low-power transmission point, it is preferable that the base station may notify the terminal of CSI-RS or CRS information and transmission power that are transmitted by the low-power transmission point and thus allow the terminal to estimate the path loss.

The following cases may occur in simultaneous transmission of uplink UL-SCH and UCI.

(Case 1) UL-SCH and UCI are simultaneously transmitted using PUSCH, and reception points of the UL-SCH and the UCI are the same.
Since UL-SCH scheduling and UCI transmission are set at the reception point, there is no problem associated with the reception.

(Case 2) UL-SCH and UCI are simultaneously transmitted using PUSCH, and reception points of the UL-SCH and the UCI are different.
On the assumption that dynamic PUSCH scheduling information exchange is not accomplished between the reception points, it is difficult that both the reception points and the terminal recognize an accurate transmission format, and thus Case 2 should be prevented from occurring.

(Case 3) PUSCH and PUCCH are simultaneously transmitted in the same subframe, and reception points of the PUSCH and the PUCCH are the same.
Since UL-SCH scheduling and UCI transmission are set at the reception point, there is no problem.

(Case 4) PUSCH and PUCCH are simultaneously transmitted in the same subframe, and reception points of the PUSCH and the PUCCH are different.
On the assumption that dynamic PUSCH scheduling information exchange is not accomplished between the reception points, it is difficult that both the reception points and the terminal recognize power actually used for each channel, and thus it is preferable that Case 4 be prevented from occurring. It is preferable that power control is preferentially performed on the PUCCH and the remaining power is allocated to the PUSCH.

As described above, it is not preferable that data or control information having different reception points is transmitted in the same subframe. Accordingly, uplink subframes usable by the reception points needs to be divided without overlap and then used. As a detailed temporal resource division method, the temporal resource division method described for the above-described Inter-site CA may be applied.

Method of Supporting Dual Connectivity in Cell Arrangement that Uses Different Cell IDs A method of supporting dual connectivity in a cell arrangement in which the high-power transmission point and the low-power transmission point use the same carrier but different cell IDs will be described below.

[Method 1: Resource Division Between Transmission Points in Units of Subframe

A scheme in which a downlink subframe usable for each transmission point is determined may be used. Assume that, in consideration of transmission point A and transmission point B that are geographically spaced apart, the terminal communicates with the two transmission points. When it is assumed that the two transmission points are connected via non-ideal backhaul, it is preferable that the transmission points communicate with the terminal using a scheme to be described below.

First, a downlink subframe used by transmission point A and a subframe used by transmission point B are predetermined not to overlap each other. This corresponds to a case in which downlink resources are divided in advance and used because of an environment in which a scheduling cooperation of the two transmission points is not accomplished instantly and dynamically. Through the resource separation in units of a subframe, the terminal may receive resources from only one transmission point in the same subframe.

It is preferable that the terminal be aware of which transmission point is enabled to perform transmission in any subframe in order for the terminal to perform normal reception from the transmission points.

In order to successfully monitor PDCCH, the terminal should be aware in advance of the following information:
Physical layer cell ID used for PDCCH transmission (information obtained from PSS/SSS);
The number of CRS antenna ports (information obtained from Physical Broadcast Channel (PBCH));
Transmission bandwidth (information obtained from PBCH);
Size of control region (information carried by PCFICH); and
PHICH setting information (information obtained from PBCH)

When each of the two transmission points forms a cell having a unique cell ID, the terminal needs the above-described information for the PDCCH transmissions of the two cells in order to monitor the PDCCH transmissions of the two transmission points. When the terminal is connected with the high-power transmission point, the terminal acquires information about a cell formed by the high-power transmission point through a typical procedure. Meanwhile, it is preferable that the base station transmits information about the low-power transmission point to the terminal through terminal-specific signaling.

The base station should deliver in advance mapping information between the subframe and the transmission point to the terminal through signaling such that the terminal may be aware of a transmission point that is subject to the PDCCH monitoring in every subframe. The terminal monitors a PDCCH common search space and a terminal-specific search space on the assumption of transmission of the transmission point determined from the information acquired through signaling of the base station in every subframe.

[Method 2: Search Space Division Between Transmission Points]

When the terminal supports reception of EPDCCH, a scheme in which the terminal monitors PDCCH transmitted by the high-power transmission point and monitors only EPDCCH transmitted by the low-power transmission point may be used. In particular, this scheme may be usefully applied to a case in which the low-power transmission point uses a new carrier type (NCT) that does not allow CRS-based transmission. This is because the NCT does not transmit a channel that is decoded with CRS.

When the terminal monitors PDCCH transmitted by the high-power transmission point (macro cell) and monitors only EPDCCH of the low-power transmission point (small cell) in order to receive DCI, it is preferable that the terminal monitors PDCCH in a PDCCH common search space and monitors EPDCCH in an EPDCCH terminal-specific search space.

The terminal may monitor PDCCH transmitted by the macro cell using information acquired from PSS/SSS, PBCH or the like of the macro cell.

Unlike PDCCH, when the terminal monitors EPDCCH, the base station should separately transmit information needed to receive EPDCCH to the terminal. The information needed to receive EPDCCH may include the following information:

Information about OFDM symbol in which EPDCCH transmission starts;
CRS setting information: cell ID or the number of CRS antenna ports;
Non-Zero Power (NZP) CSI-RS setting information and Zero Power (ZP)
CSI-RS setting information; and
Quasi co-location information The quasi co-location information may be setting information of CRS antenna ports (antenna ports 0 to 3) or CSI-RS antenna ports (antenna ports 15 to 22) that is quasi co-located with DM RS antenna ports (antenna ports 107 to 110) used for EPDCCH decoding. Here, the quasi co-location information should be setting information of CRS antenna ports, which is transmitted by a transmission point that transmits EPDCCH to the terminal or setting information of CSI-RS antenna ports, which is transmitted by a transmission point that transmits EPDCCH to the terminal.

The terminal recognizes that CSI-RS resources are excluded in an EPDCCH resource mapping from the CRS setting information, non-zero power (NZP) CSI-RS setting information, or zero power (ZP) CSI-RS setting information of the transmission point that transmits EPDCCH.

When the low-power transmission point (small cell) transmits its own control channels PCFICH/PHICH/PDCCH, there may occur a problem of interference with the high-power transmission point. In order to solve the interference problem, control channel resources are temporally divided and then used by the two transmission points. When a CRS is transmitted although the control channels are temporally divided and used, the CRS of the small cell acts as interference to the control channel of the macro cell. On a condition that the terminal has a function of performing interference cancellation of CRS, the CRS interference problem may be solved with a technique in which the terminal receives a CRS giving strong interference, performs estimation, and then subtract an estimated signal from a received signal.

By using the above-described method, the terminal may maintain a connection with the high-power transmission point via the PDCCH and also maintain a connection with the low-power transmission point via the EPDCCH.

Transmission Method for Supporting Dual Connectivity in Non-Ideal Backhaul

A transmission method for supporting dual connectivity in a non-ideal (or limited) backhaul environment will be described below. As described above, it may not be preferable that one terminal simultaneously transmits two signals or channels to different reception points in the same subframe.

Here, the term "reception point" is used in description in terms of uplink. For convenience of description, a high-power transmission point in terms of downlink is referred to as a large-region reception point in terms of uplink, and a low-power transmission point in terms of downlink is referred to as a small-region reception point in terms of uplink. In addition, it should be noted that one transmission point may form one independent cell or a plurality of transmission points may form one cell. In the following description, according to a cell forming scheme, each transmission point, reception point, or transmission/reception point may form one cell, or a plurality of transmission points, reception points, or transmission/reception points may form one cell.

The term "transmission point," "reception point," or "transmission/reception point" used below denotes one transmission point, reception point, or transmission/reception point or denotes a set of transmission points, a set of reception points, or a set of transmission/reception points when a Coordinated Multi Point (CoMP) scheme is considered.

Downlink Transmission Timing

The following two methods may be considered as a method of setting downlink transmission timings of the large-region transmission/reception point and the small-region transmission/reception point.

Method 1: Large-region transmission/reception point and small-region transmission/reception point have the same downlink timing.

Method 2: Considering propagation delay of the large-region transmission/reception point and the small-region transmission/reception point, in terms of reception of the terminal, downlink reception timings of the two transmission/reception points are the same or have a difference that is less than a cyclic prefix (CP).

Figure 10:
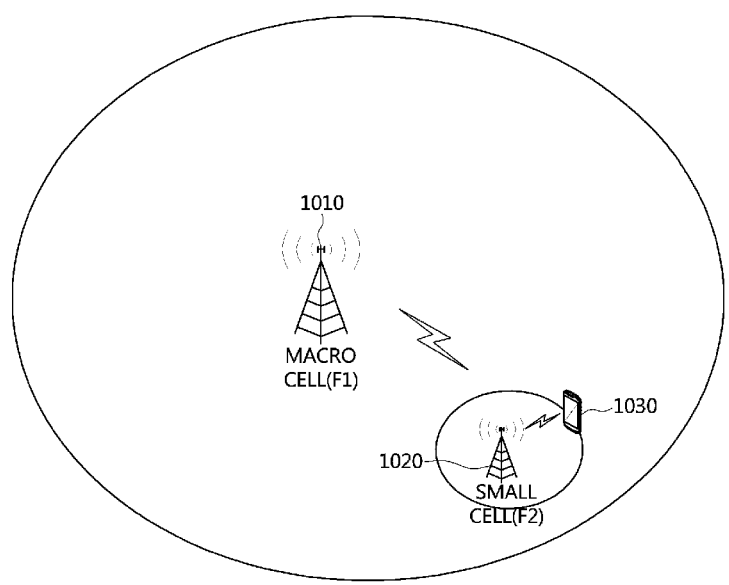
FIG. 10 is an exemplary diagram illustrating a cell arrangement in which a downlink transmission timing method of two transmission/reception points is applied.

FIG. 9 illustrates a downlink transmission timing method of two transmission/reception points. In addition, FIG. 10 is an exemplary diagram illustrating a cell arrangement in which a downlink transmission timing method of two transmission/reception points is applied.

In FIG. 9, two transmission/reception points are represented as transmission/reception point A and transmission/reception point B, and downlink transmission timings are shown when method 1 and method 2 are used, respectively. Here, it is assumed that transmission/reception point A is the large-region transmission/reception point, and transmission/reception point B is the small-region transmission/reception point. In a scheme in which one transmission/reception point forms one cell, transmission/reception point A corresponds to a macro cell transmission/reception point, and transmission/reception point B corresponds to a small cell transmission/reception point.

FIG. 9A corresponds to method 1, in which two transmission/reception points have the same downlink subframe timing. FIG. 9B corresponds to method 2, in which a transmission timing of a downlink subframe of transmission/reception point B is set as a time point delayed by a time Δ corresponding to a propagation delay over the transmission/reception point A. Method 2 has an advantage in that the reception timings of the downlink subframes of transmission/reception point A and transmission/reception point B are almost the same in terms of a terminal near transmission/reception point B. In order to support dual connectivity, the terminal may need to receive downlink signals transmitted by the two transmission/reception points, which are temporally divided in units of a subframe. In this case, when the downlink timing of method 2 is used, the downlink subframes received by the terminal does not (barely) overlap each other. Thus, wireless resource use efficiency of method 2 is higher than that of method 1. Method 2 is a method in which, when a terminal 1030 is located in a small cell that is far from a macro cell transmission/reception point 1010 (that is, when transmission/reception point A of FIG. 9 corresponds to the macro cell transmission/reception point 1010, and transmission/reception point B corresponds to a small cell transmission/reception point 1020), a small cell transmission timing is delayed by a propagation delay from the macro cell transmission/reception point 1010 to the small cell region such that the downlink reception timings of the macro cell and the small cell are the same or almost the same.

In order to realize method 2, the small cell may receive a synchronization signal or CRS of the macro cell, acquire a downlink reception timing of the macro cell, and use the downlink reception timing as its own downlink transmission timing. Alternatively, the terminal 1030 located near the small cell transmits PRACH using a downlink reception timing condition and a PRACH transmission timing condition in an existing specification. In this case, on the assumption that the terminal 1030 is close to the small cell and thus a propagation delay between the terminal and the small cell is very small (equal to or less than about 1 us), the small cell may receive PRACH transmitted by the terminal 1030, estimate a macro cell downlink reception timing of the terminal, and use the reception timing as its own downlink transmission timing. The macro cell rather than the small cell may receive PRACH transmitted by the terminal 1030, estimate a propagation delay value between the terminal 1030 and the macro cell transmission/reception point 1010, and deliver the propagation delay value to the small cell.

Uplink Transmission Timing

When the terminal has a low SINR with respect to at least one of the two reception points, it is not preferable that uplink transmission to be received by the large-region reception point and uplink transmission to be received by the small-region reception point are simultaneously performed in the same subframe. In addition, considering a case in which the terminal performs transmission to the large-region reception point and the small-region reception point in different uplink subframes using only one uplink carrier, it is preferable that the uplink transmission to be received by the large-region reception point and the uplink transmission to be received by the small-region reception point are not performed in the same subframe.

In order for the terminal to use different uplink subframes for an uplink to be received by the large-region reception point and an uplink to be received by the small-region reception point, some uplink subframes may be used for reception of the small-region reception point, and the other uplink subframes may be used for reception of the large-region reception point.

Since the large-region reception point and the small-region reception point are located at geographically different positions, it is preferable that an uplink transmission timing of the terminal is managed separately for each reception point. Accordingly, the terminal may receive an uplink timing corresponding to each reception point from a corresponding base station in the form of a timing advance (TA). When the transmission is performed in any subframe, the terminal may perform uplink transmission using an uplink timing to be applied to a corresponding reception point in consideration of a reception point corresponding to the subframe.

Figure 11:
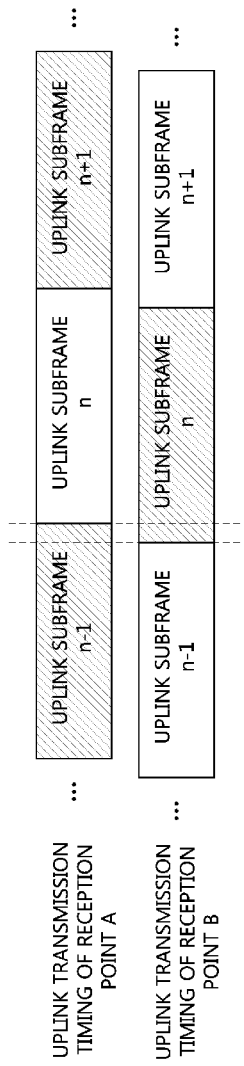
FIG. 11 illustrates an uplink transmission timing method of two reception points.

FIG. 11 illustrates an uplink transmission timing method of two reception points. As illustrated in FIG. 11, when two uplink subframes temporally neighboring each other correspond to different reception points, uplink transmission timings to be applied to the two subframes are different from each other, and thus there may be a part in which the two subframes temporally overlap each other. When the terminal has a low SINR with respect to at least one of the two reception points, it is not preferable that uplink transmission to be received by the large-region reception point and uplink transmission to be received by the small-region reception point are simultaneously performed at the same time. In addition, considering a case in which the terminal performs transmission to the large-region reception point and the small-region reception point in different subframes using only one uplink carrier, the uplink transmission to be received by the large-region reception point and the uplink transmission to be received by the small-region reception point cannot be simultaneously performed at the same time.

As shown in FIG. 11, if an overlap problem occurs between neighboring subframes, the terminal should select one of two reception points in the overlap region and perform transmission for selected reception point. If the reception of the large-region reception point is prioritized, in order to protect a subframe corresponding to the large-region reception point, the terminal may transmit all subframes corresponding to the large-region reception point and may not transmit a partial overlap area of the subframe corresponding to the small region reception point. For example, as shown in FIG. 11, when uplink transmission timing of reception point A and uplink transmission timing of reception point B are different, the terminal transmits an entire uplink subframe corresponding to a reception point having a high priority according to the priority. However, with respect to an uplink subframe corresponding to a reception point having a relatively low priority, the terminal does not transmit an overlap region with an uplink subframe corresponding to a reception point having a high priority.

A method of fundamentally solving the overlap problem between the above-described subframes is to allow the uplink transmission timing to be the same with respect to one of the two reception points.

Figure 12:
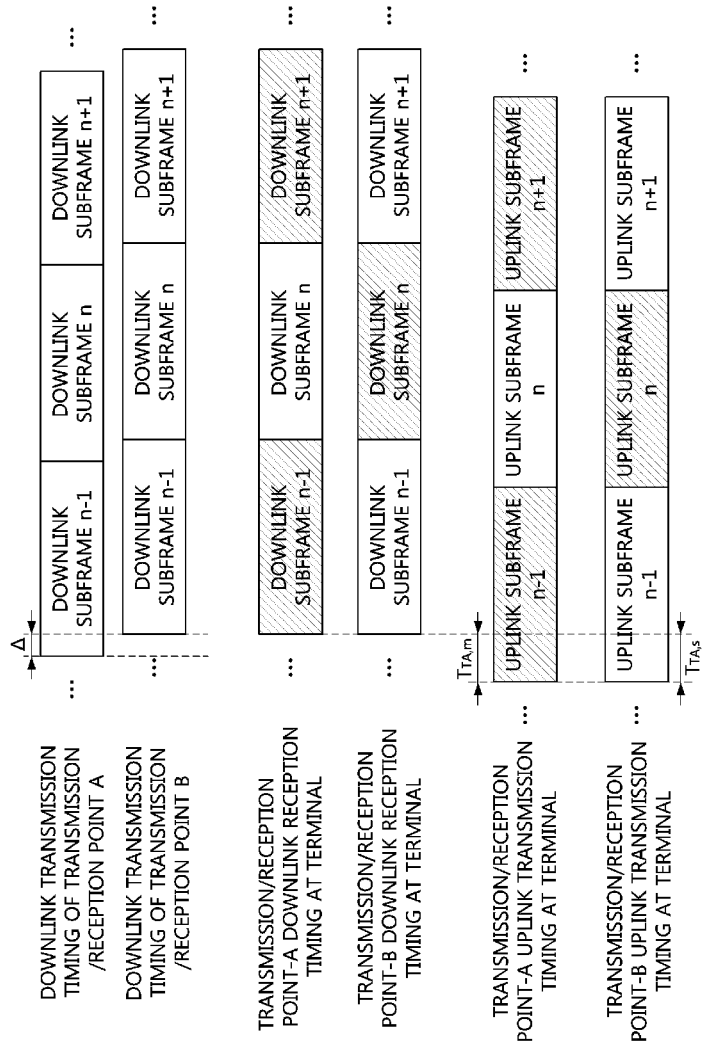
FIG. 12 illustrates downlink and uplink transmission timing methods of two reception points.

FIG. 12 illustrates downlink and uplink transmission timing methods of two reception points. Referring to FIG. 12, in terms of reception of the terminal, downlink reception timings of the two transmission/reception points are the same or have a reception timing difference Δ that is adjusted to be less than a CP. Next, in terms of transmission of the terminal, the terminal uses the same or almost the same transmission timing (within the CP length) for uplink timings of reception point A and reception point B. By using the uplink timings, as shown in FIG. 11, the overlap problem between the subframes does not occur or occurs only in a short time period within the CP length, thereby preventing a large problem from occurring in reception quality at the reception point. The temporal overlap region between the subframes is very small. Thus, when subframe n and subframe n+1 that have different reception points temporally overlap each other, a scheme in which subframe n is entirely transmitted and subframe n+1 is partially transmitted except for an overlap part may be used.

As shown in FIG. 12, the small cell should deliver an appropriate timing advance (TA) command to the terminal in order for the terminal to use the same or almost the same uplink transmission timing for the reception points. Small cell transmission/reception point B may determine a transmission timing of a downlink subframe as a time point delayed by a time Δ corresponding to a propagation delay over macro cell transmission/reception point A and may signal the terminal such that a time corresponding to 2×Δ is the TA for an uplink transmission timing of the terminal. Thus, in terms of the small-cell transmission/reception point, the downlink transmission timing and the uplink reception timing has a time difference of 2×Δ. That is, in terms of transmission/reception point of the small cell, the uplink reception timing temporally leads to the downlink transmission timing by 2×Δ. When a value Δ is large, there may be a need to limit the size of a codeword and a transport block transmitted to the terminal through the downlink. This is because the terminal may not secure a sufficient processing time for the uplink transmission.

According to the legacy LTE Release 11 specification, the terminal may be set to have a plurality of timing advance groups (TAGs), and the terminal may perform contention-free random access even in SCell in addition to PCell. A response of the base station to PRACH transmission of the terminal in the contention-free random access is transmitted to PCell. In this case, PDCCH or EPDCCH including scheduling information of the used response message is transmitted in a common search space.

As described above, the uplink timing needs to be managed for each transmission/reception point in order for the two transmission/reception points and the terminal that exchange information via non-ideal backhaul to maintain dual connectivity. In this case, the two transmission/reception points may use the same or different frequencies. In terms of the LTE Release-11 specification, separation and management of the uplink timings of the two transmission/reception points denote that different TAs are transmitted to the two transmission/reception points and the terminal manages and applies the TA for each transmission/reception point. However, as shown in FIG. 12, when the same uplink timing is intended to be applied to the two transmission/reception points, the terminal may use a method of applying an uplink timing of one transmission/reception point to both the uplink timings of the two transmission/reception points. That is, the terminal applies the uplink timing applied to the macro cell transmission/reception point even to the uplink timing for the small cell transmission/reception point. When this scheme is used, the terminal applies one TA to the two transmission/reception points.

Method of Transmitting HARQ-ACK Using Subframe Aggregation

The subframe aggregation method extends an uplink HARQ-ACK transmission method according to carrier aggregation into subframes on a time axis. The uplink HARQ-ACK transmission method using the subframe aggregation is as follows.

An uplink subframe for each reception point is set in advance to the terminal. Here, it is preferable that uplink subframes corresponding to reception points are allocated at certain distances, and the distance between the uplink subframes is allocated in units of an uplink HARQ process in consideration that a round trip time (RTT) of an uplink HARQ process is 8 ms because a collision between the PUSCH transmission for reception of a different reception point of the terminal and the HARQ process may be avoided.

Only when to each allocated uplink subframe has corresponding downlink subframes, and PDCCH/EPDCCH that instructs release of one or more PDSCHs or SPSs is received in the corresponding downlink subframes, the terminal generates and transmits HARQ-ACK information to the base station.

The number of HARQ-ACK bits is determined according to a transmission mode of the downlink carrier. That is, when the set transmission mode supports transmission of up to two transport blocks in one subframe, the HARQ-ACK bit number is 2 bits per subframe. When the set transmission mode supports transmission of one transport block, the HARQ-ACK bit number is 1 bit per subframe. As such, the total number of HARQ-ACK bits is determined according to the transmission mode and the number of downlink subframes.

When the set transmission mode supports transmission of up to 2 transport blocks in one subframe and only one transport block is received by the terminal, NACK is generated for the other transport block.

When the set transmission mode supports transmission of up to 2 transport blocks in one subframe and only one transport block is received by the terminal, HARQ-ACK information about the other transport block is considered as NACK.

On a condition that the terminal generates and transmits HARQ-ACK information to the base station (that is, when the uplink subframe has corresponding downlink subframes, and PDCCH/EPDCCH instructing release of one or more PDSCHs or SPSs in the corresponding downlink subframes is received), when the set transmission mode supports transmission of up to 2 transport blocks in one subframe, but the terminal does not receive both of the two transport blocks, HARQ-ACK information about respective transport blocks generates NACK. In addition, when the set transmission mode supports transmission of one transport block in one subframe and the transport block is not received, HARQ-ACK information about the transport block is considered as NACK.

When a scheduling request (SR) resource is allocated in the subframe in which the terminal transmits HARQ-ACK information, the information is configured by adding one bit in order to represent an SR state in the HARQ-ACK information. Here, the one bit indicates the occurrence of a scheduling request. For example, the bit is represented as '1' when the scheduling request occurs, and represented as '0' when the scheduling request does not occur.

The terminal uses PUCCH to transmit the generated HARQ-ACK information or inserts the HARQ-ACK information into PUSCH and then transmits the HARQ-ACK information. When the terminal transmits the HARQ-ACK using PUCCH, PUCCH format 3 of the LTE specification may be used.

CSI information (e.g., CQI, PMI, RI, etc.) and SR information, which are uplink control information other than HARQ-ACK, are transmitted using uplink subframes corresponding to reception points that should receive control information.

Figure 13:
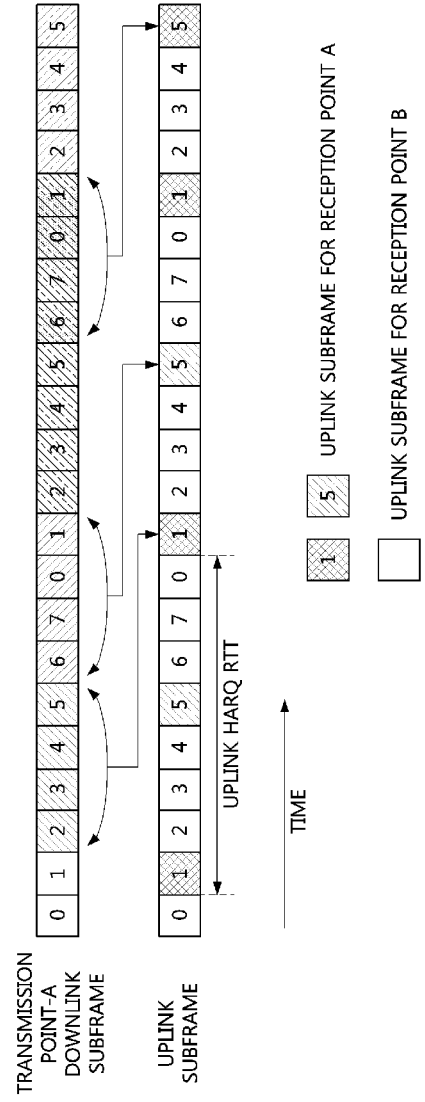
FIG. 13 illustrates an example of a HARQ-ACK information transmission method using subframe aggregation.

FIG. 13 illustrates an example of a HARQ-ACK information transmission method using subframe aggregation.

In FIG. 13, when it is assumed that an uplink transmission mode of a terminal is set as a transmission mode of supporting one transport block in one subframe, the number of uplink HARQ processes that can be set by the terminal is up to 8. In FIG. 13, the number represented in the uplink subframe denotes an uplink HARQ process number to which the subframe belongs. When it is assumed that an uplink transmission mode of a terminal is set as a transmission mode of supporting up to 2 transport blocks in one subframe, the number of uplink HARQ processes that can be set by the terminal is up to 16. Irrespective of the transmission mode of the terminal, the RTT of the HARQ process is 8 ms.

FIG. 13 illustrates that an uplink subframe for reception point A (hereinafter referred to as a "reception-point-A uplink subframe") is periodically allocated every four subframes. That is, subframes corresponding to two HARQ processes represented as number 1 and number 5 among a total of 8 uplink HARQ processes are allocated as the uplink subframes for reception point A.

When the reception-point-A uplink subframe is uplink subframe n, corresponding downlink subframes are subframe n−7, subframe n−6, subframe n−5, and subframe n−4. That is, when the terminal receives PDCCH/EPDCCH that instructs release of PDSCH or SPS in downlink subframe n−7, downlink subframe n−6, downlink subframe n−5, or downlink subframe n−4, the terminal generates HARQ-ACK information corresponding thereto and transmits the generated HARQ-ACK information in uplink subframe n.

Figure 14:
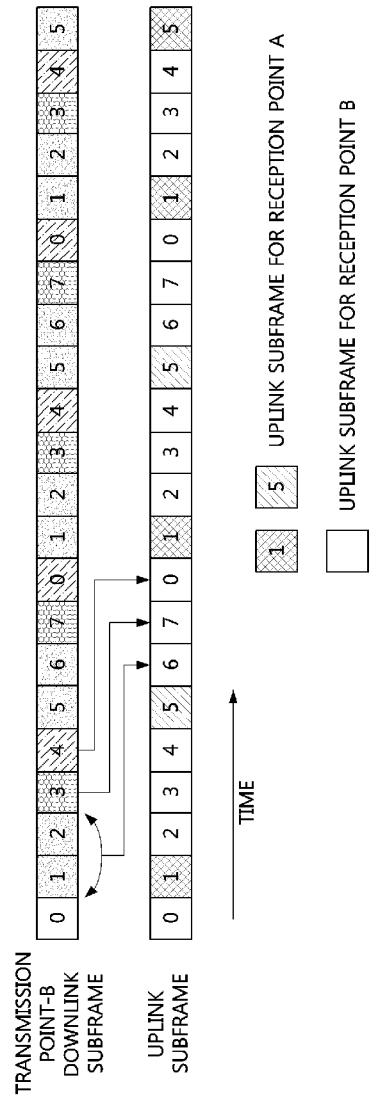
FIG. 14 illustrates another example of a HARQ-ACK information transmission method using subframe aggregation.

FIG. 14 illustrates another example of a HARQ-ACK information transmission method using subframe aggregation.

FIG. 14 illustrates that an uplink subframe for reception point B (hereinafter referred to as a "reception-point-B uplink subframe") includes subframes corresponding to 6 HARQ processes represented as number 0, number 2, number 3, number 4, number 6, and number 7 among a total of 8 uplink HARQ processes. Here, when uplink subframe n, which is the reception-point-B uplink subframe, belongs to subframes corresponding to a zeroth uplink HARQ process, a third uplink HARQ process, a fourth uplink HARQ process, and a seventh uplink HARQ process, a downlink subframe of reception point B corresponding to uplink subframe n is subframe n−4. Accordingly, when the terminal receives PDCCH/EPDCCH that instructs release of PDSCH or SPS in downlink subframe n−4, the terminal generates HARQ-ACK information corresponding thereto and transmits the generated HARQ-ACK information in uplink subframe n. On the other hand, when uplink subframe n, which is the reception-point-B uplink subframe, belongs to subframes corresponding to a second uplink HARQ process and a fifth uplink HARQ process, the uplink subframe n is downlink subframes corresponding to downlink subframe n−4 and downlink subframe n−5 of reception point B. Accordingly, in this case, when the terminal receives PDCCH/EPDCCH that instructs release of PDSCH or SPS in downlink subframe n−4 and downlink subframe n−5, the terminal generates HARQ-ACK information corresponding thereto and transmits the generated HARQ-ACK information in uplink subframe n.

The above-described scheme may be applied to a case in which the number of uplink carriers used by the terminal to perform transmission is one. In addition, the above-described scheme may also be applied to a case in which the number of uplink carriers used by the terminal to perform transmission is two or more, the uplink carriers are different for each reception point, and the terminal is allocated uplink subframes to be used for transmission for each reception point.

Unlike the above-described method, a HARQ-ACK transmission method when one uplink subframe corresponds to one downlink subframe will be described below.

Figure 15:
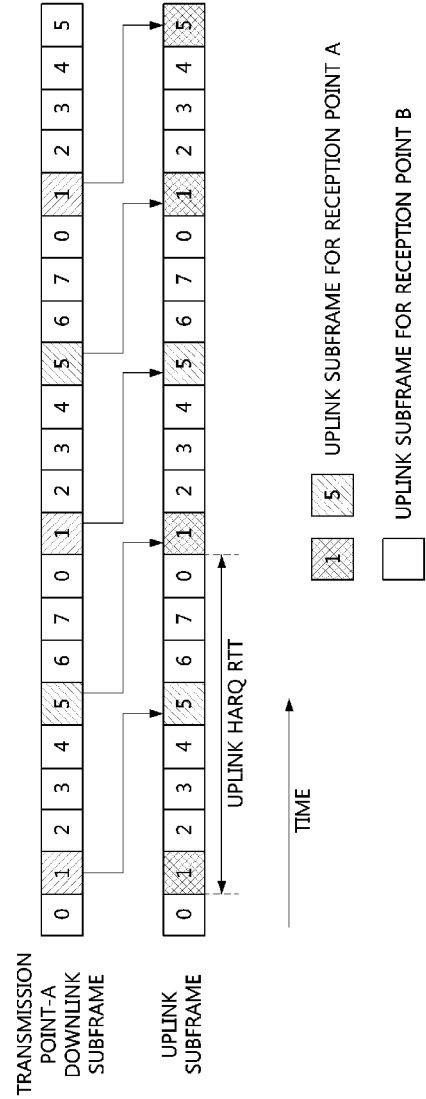
FIG. 15 illustrates an example of a HARQ-ACK transmission method when a downlink subframe corresponds to an uplink subframe in a one-to-one manner.

FIG. 15 illustrates an example of a HARQ-ACK transmission method when a downlink subframe corresponds to an uplink subframe in a one-to-one manner.

In FIG. 15, when uplink subframe n, which is a reception-point-A uplink subframe, corresponds to downlink subframe n−4, and the terminal receives PDCCH/EPDCCH that instructs release of PDSCH or SPS in downlink subframe n−4, the terminal generates HARQ-ACK information corresponding thereto and transmits the generated HARQ-ACK information in uplink subframe n.

Figure 16:
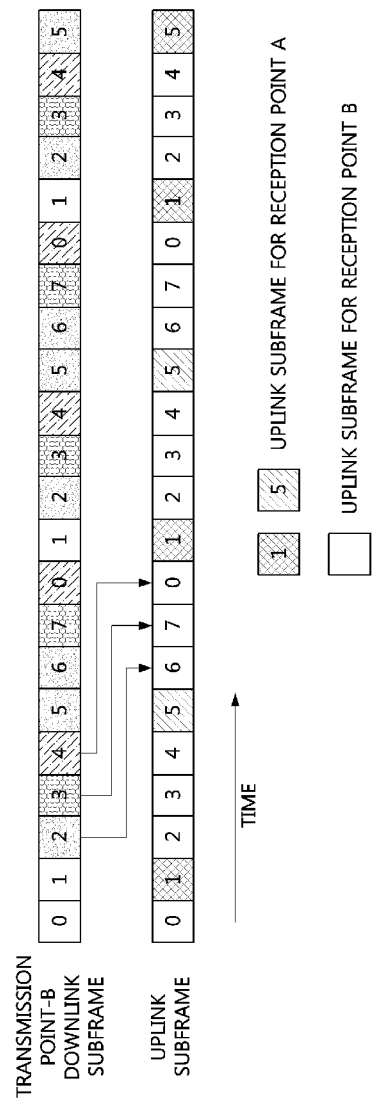
FIG. 16 illustrates another example of a HARQ-ACK transmission method when a downlink subframe corresponds to an uplink subframe in a one-to-one manner.

FIG. 16 illustrates another example of a HARQ-ACK transmission method when a downlink subframe corresponds to an uplink subframe in a one-to-one manner.

In FIG. 16, when uplink subframe n, which is a reception-point-B uplink subframe, corresponds to downlink subframe n−4, and the terminal receives PDCCH/EPDCCH that instructs release of PDSCH or SPS in downlink subframe n−4, the terminal generates HARQ-ACK information corresponding thereto and transmits the generated HARQ-ACK information in uplink subframe n.

Consideration of Downlink SPS, Uplink SPS, SRS Subframe Period, and CQI Reporting Period According to the LTE Release-11 specification, one of 10, 20, 32, 40, 64, 80, 128, 160, 320, and 640 may be used as a time period of semi-persistent scheduling (SPS) in units of a subframe. Here, the SPS time period denotes an allocation period of a subframe in which an initial transmission or first transmission occurs in HARQ. A subframe for retransmission for the initial transmission is allocated every eight subframes from the subframe in which an initial transmission occurs. It is preferable that SPS allocation is allowed in subframe allocation for each reception point.

Figure 17:
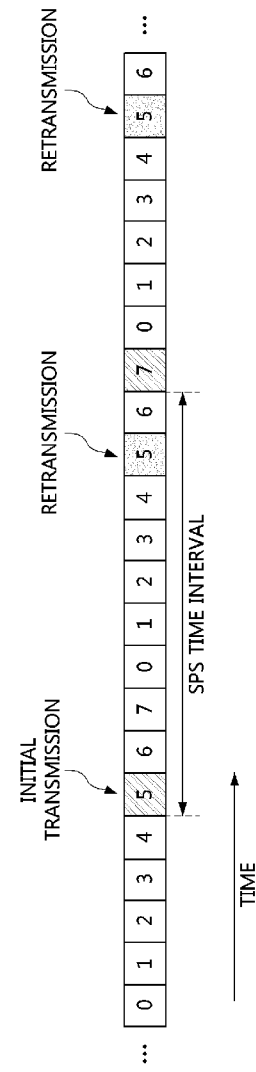
FIG. 17 illustrates a subframe allocation method for SPS.

FIG. 17 illustrates a subframe allocation method for SPS. FIG. 17 shows a case in which an SPS allocation time period is 10 ms. Here, the SPS allocation time period denotes a time period of initial transmissions, and FIG. 17 illustrates that the time period is 10 ms. As shown in FIG. 17, when retransmission after any initial transmission occurs in the SPS allocation, first retransmission may be performed in a subframe apart from the initial transmission by 8 ms, and then the retransmission may be accomplished at every interval of 8 ms.

It is preferable that the SPS time period that can be allocated in the subframe allocation for each reception point supports 10, 20, 32, 40, 64, 80, 128, 160, 320, and 640, which are existing SPS allocation time periods. In addition, a parameter for determining the SPS allocation may include an SPS time period and a subframe offset in an existing specification.

According to the LTE Release-11 specification, a time period of periodic CSI reporting may be 2, 5, 10, 20, 40, 80, 160, 32, 64, or 128 in units of a subframe.

In addition, according to the LTE Release-11 specification, the SRS subframe period is as follows.

A setting time period of a cell-specific SRS subframe is 1, 2, 5, or 10 for FDD and 2, 5, or 10 for TDD in units of a subframe.

A terminal specific SRS time period is 2, 5, 10, 20, 40, 80, 160, or 320 for FDD and 2, 5, 10, 20, 40, 80, 160, or 320 for TDD in units of a subframe.

Similarly to a case of SPS allocation, subframe allocation for CSI reporting to each reception point and SRS subframe allocation should be possible. Here, since code division multiplexing (CDM) with another terminal is applied to CSI reporting and SRS transmission of the terminal, it is preferable that even new terminals support time periods defined in the legacy LTE specification.

In summary, the subframes may be allocated for each reception point using the following schemes:

Subframe allocation in units of HARQ process;
Existing terminal-specific SRS subframe allocation; and
Existing periodic CSI reporting subframe allocation.

It is preferable that the terminal-specific SRS subframes allocated for different reception points do not temporally overlap one another (that is, do not simultaneously occur in the same subframe). When an allocation time period and a subframe offset of each SRS subframe are adequately chosen, the SRS subframes may be allocated to the reception points without overlap. For the periodic CSI reporting, it is also preferable that periodic CSI reporting subframes allocated for the different reception points do not simultaneously occur in the same subframe (that is, do not simultaneously occur in the same subframe). When an allocation time period and a subframe offset of each periodic CSI reporting subframe are adequately chosen, the periodic CSI reporting subframes may be allocated to the reception points without overlap.

When the subframes are allocated only using the above-described reception point-based uplink subframe setting method, a reception point-based subframe is set in units of an uplink HARQ process. Thus, it is preferable that an uplink transmission period of SPS, CIS reporting, SRS or the like of the terminal is also based on the RTT of the uplink HARQ process and allowed to be an integer number of times greater than the RTT. Accordingly, it is preferable that the SPS transmission period and the CSI reporting period include 8, 16, 24, and 32 (in units of subframe) in the FDD. In addition, it is preferable that 8, 16, 24, 48, or the like, which is not included in the LTE Release-11 specification, is added as a selectable period. It is also preferable that the terminal-specific SRS period has 8, 16, 24, 48, or the like added as a selectable period in the FDD. It is also preferable that a setting period of the cell-specific SRS subframe has 4, 8, 16, or the like added as a selectable period.

Collision Processing Method

In the above-described reception point-based uplink subframe setting method, an uplink HARQ process may be allocated for each reception point, and also resource allocation using SPS can be performed. However, in general, the time interval between initial transmissions by SPS allocation may not be an integer number of times greater than an uplink RTT, thus causing a collision problem. For example, when a downlink SPS having an allocation period of 10 ms is allocated to reception point A, and an uplink resource is allocated to reception point B through an uplink grant, the uplink subframe of reception point B and the SPS allocation subframe for reception pint A may overlap each other. In this situation, the terminal may be set to select one of two reception points, perform transmission to the selected reception point, but not to the other reception point. A transmission method of the terminal, which processes a collision in the above-described environment, will be described below.

Since it is difficult that dynamic scheduling information is instantly exchanged between two transmission/reception points, a base station that manages transmission/reception point A (hereinafter referred to as a "transmission/reception-point-A base station") cannot be aware in advance of whether the SPS allocation and the dynamic allocation have occurred in the same subframe. On the contrary, a base station that manages transmission/reception point B (hereinafter referred to as a "transmission/reception-point-B base station") may be provided in advance with SPS allocation information from transmission/reception point A and may be aware in advance of a subframe in which the SPS allocation has occurred.

In this situation, when the SPS transmission may be assumed in the SPS allocation by the transmission/reception-point-A base station, blind detection need not be performed. Thus, there is an advantage in that a reception process of the base station may be simplified. In addition, considering that a change of the resource allocation is not easier than that of the dynamic allocation through grant since the SPS allocation is performed semi-statically and that the dynamic allocation through grant transmission has a degree of freedom in which subframes to be transmitted may be dynamically allocated, it is preferable that the SPS allocation is prioritized over the dynamic allocation. Accordingly, when it is assumed that the terminal is served by transmission/reception point A and transmission/reception point B, the terminal may follow a transmission form to be described below.

When the PUSCH transmission for transmission/reception point A in the uplink SPS resource allocation occurs in a transmission/reception-point-B uplink subframe, the terminal performs PUSCH transmission for the transmission/reception point A in the uplink subframe, but does not perform transmission for transmission/reception point B.

When transmission/reception point A transmits PDSCH by downlink SPS resource allocation, and uplink HARQ-ACK transmission corresponding to the transmission occurs in the transmission/reception-point-B uplink subframe, the terminal performs the transmission for transmission/reception point A in the subframe, but does not perform transmission for transmission/reception point B.

Table 6 shows examples of collisions of resource allocation that may occur in the uplink resource allocation for different transmission/reception points.

TABLE 6

| Transmission/ reception point A | Transmission/reception point B | | | |
|---|---|---|---|---|
| | SPS transmission | CSI reporting | HARQ-ACK | SRS |
| SPS transmission | Collision form (6) | Collision form (5) | Collision form (4) | Avoidable collision |

TABLE 6-continued

| Transmission/ reception point A | Transmission/reception point B | | | |
|---|---|---|---|---|
| | SPS transmission | CSI reporting | HARQ-ACK | SRS |
| CSI reporting | Collision form (5) | Collision form (7) | Collision form (2) | Collision form (3) |
| HARQ-ACK | Collision form (4) | Collision form (2) | Collision form (8) | Collision form (1) |
| SRS | Avoidable collision | Collision form (3) | Collision form (1) | Collision form (9) |

The collision form shown in Table 6 will be described below.

Collision form (1): HARQ-ACK for transmission/reception point A may dynamically occur. When HARQ-ACK transmission subframe and the SRS subframe overlap each other, and the terminal does not transmit SRS (that is, the terminal drops the transmission of the SRS), transmission/reception point B is not aware of this. Thus, an additional effort should be made to detect whether to receive the SRS. A method of avoiding this is to make cell-specific SRS subframe settings of the two transmission/reception points the same. Thus, the terminal may simultaneously transmit HARQ-ACK and SRS, and the two transmission/reception points may receive the HARQ-ACK and SRS without ambiguity. When the two transmission/reception points form the same cell, the two transmission/reception points have the same cell-specific SRS subframe setting. Thus, cell-specific SRS subframes of the two transmission/reception points are always the same.

Collision form (2): HARQ-ACK for transmission/reception point A may dynamically occur. When the HARQ-ACK overlaps a periodic CSI report transmission subframe, the terminal drops the CSI reporting. In order to simplify the reception at transmission/reception point B, the transmission of the CSI report may be dropped in all subframes having the collision possibility.

Collision form (3): the transmission of SRS is dropped. The transmission of SRS may be dropped in all subframes having the collision possibility.

Collision form (4): the transmission is determined according to a predetermined priority. The SPS transmission or the HARQ-ACK transmission may be dropped according to the priority. When the SPS transmission is dropped, it is preferable to drop the SPS transmission in all subframes having the collision possibility in order not to increase reception complexity at a reception point. On the contrary, the HARQ-ACK transmission may be dropped. In this case, the terminal may drop the HARQ-ACK transmission and perform the SPS transmission when the HARQ-ACK occurs in the same subframe as the SPS transmission.

Collision form (5): the transmission is determined according to a predetermined priority. The SPS transmission or the CSI reporting may be dropped according to the priority. When one of the two transmissions is dropped, the transmission should be dropped in all subframes having collision possibility in order to simplify the reception at the reception point.

Collision forms (6), (7), (8), and (9): the collision may be avoided when appropriate allocation is performed. If the collision occurs, a signal/channel for which the transmission is to be dropped is determined according to the priority.

FDD/TDD CA Supporting Method
Supplementation of Specification for Supporting FDD/TDD CA FDD/TDD CA denotes that some of carriers set for a terminal operate in a frequency division duplex (FDD) scheme and the others operate in a time division duplex (TDD) scheme. In particular, FDD/TDD Inter-site CA denotes that a different duplex scheme is performed depending on a point where downlink transmission of the base station occurs. The LTE Release-10/11 specification does not support CA of carriers that use different duplex schemes, but needs to support FDD/TDD CA for efficient system operation. A FDD/TDD CA supporting method will be described in detail below.

Figure 18:
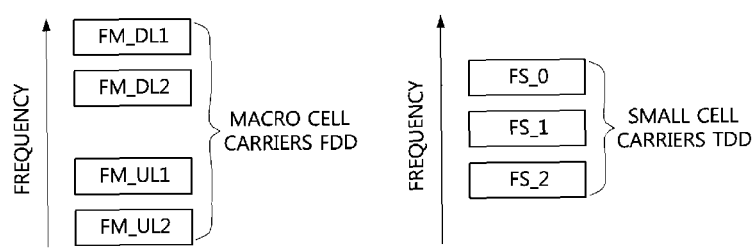
FIG. 18 illustrates an example of an FDD/TDD frequency allocation method of a macro cell and a small cell.

FIG. 18 illustrates an example of an FDD/TDD frequency allocation method of a macro cell and a small cell. FIG. 18 shows a frequency allocation method when macro cells use FDD and small cells use TDD, which is set to a terminal as an example of FDD/TDD Inter-site CA.

Since the carriers of the macro cells operate in FDD, there are uplink carriers FM_UL1 and FM_UL2 corresponding to downlink carriers FM_DL1 and FM_DL2. On the contrary, since the carriers of the small cells operate in TDD, there are a downlink subframe and an uplink subframe in one carrier.

FDD/TDD CA may be classified into intra-eNB FDD/TDD CA and inter-eNB FDD/TDD CA.

Intra-eNB FDD/TDD CA Supporting Method

Figure 19:
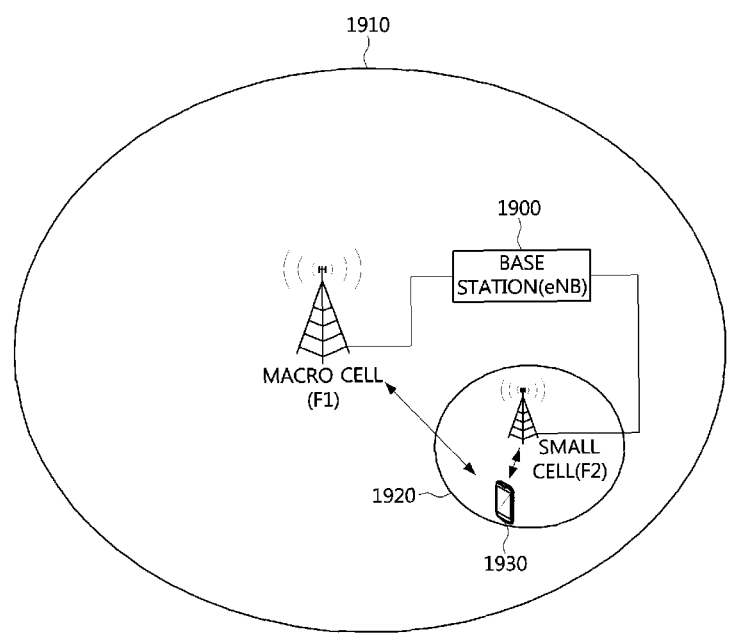
FIG. 19 is a conceptual diagram for describing a method of applying intra-eNB FDD/TDD CA to a terminal.

FIG. 19 is a conceptual diagram for describing a method of applying intra-eNB FDD/TDD CA to a terminal. As shown in FIG. 19, it is assumed that intra-eNB FDD/TDD CA has been applied to a terminal 1930. In addition, as illustrated in FIG. 18, it is assumed that macro cells 1910 operate in FDD and small cells 1920 operate in TDD and it is also assumed that the macro cells 1910 and the small cells 1920 are managed by one base station 1900 and a dynamic schedule cooperation is allowed between the macro cells 1910 and the small cells 1920.

For the intra-eNB FDD/TDD CA, the base station 1900 may manage scheduling for both of an FDD cell and a TDD cell, and thus may use the following scheme.

According to the legacy LTE Release-10/11 specification, the terminal transmits PUCCH using a cell corresponding to Pcell among cells set for CA. For FDD/TDD CA, one cell is designated as Pcell, and the terminal may transmit PUCCH using Pcell. However, in this case, specification supplementation is needed to solve problems that occur due to carriers that use different duplex methods.

For example, when one of FDD macro cells is Pcell, the terminal may use FDD Pcell to transmit uplink HARQ-ACK information corresponding to reception of downlink PDSCHs transmitted by the TDD small cells. In this case, the HARQ-ACK information of a cell using TDD is transmitted using an uplink of a cell using FDD. Both of HARQ-ACK information generated by the TDD cell and HARQ-ACK information generated by the FDD cell are transmitted using Pcell. Specifically, when PDSCH occurs in downlink subframe n of the TDD cell, HARQ-ACK information corresponding to the PDSCH is transmitted in uplink subframe n+4 through FDD Pcell. Here, since uplink HARQ-ACK transmission for the PDSCH occurring in the TDD cell is performed via an FDD cell having a different frequency, a scheme of transmitting the uplink HARQ-ACK in CA of the FDD cell may be applied with no change.

Cross carrier scheduling between the FDD carrier and the TDD carrier can be applied to FDD/TDD CA.

In addition, as described above, in case of intra-eNB CA, the PUCCH may be transmitted using a cell that is designated as a PUCCH transmission cell. In a case in which intra-eNB CA is included, the PUCCH may be transmitted using a PUCCH transmission cell designated for each cell group.

In the intra-eNB CA, when the cell using the TDD is designated as a PUCCH transmission cell of a terminal, there may exist a need to adjust a HARQ-ACK transmission timing for PDSCH transmission received in the FDD cell. This is because subframe n+4 of a TDD PUCCH transmission cell may not be the uplink subframe when the PDSCH transmission has occurred in subframe n of the FDD cell. In the simplest solution, when subframe n+4 is not the uplink subframe, the uplink HARQ-ACK may be transmitted using the earliest uplink subframe among subframes after subframe n+4.

Support of Inter-eNB FDD/TDD CA

In a case in which inter-eNB CA is included, the PUCCH may be transmitted for each cell group. Here, when the TDD cell and the FDD cell are not included in the same cell group, the PUCCH transmission is performed for each cell group. On the contrary, on a condition that the TDD cell and the FDD cell are included in the same cell group, as shown in the intra-eNB CA, when the TDD cell is designated as a PUCCH transmission cell, a HARQ-ACK transmission timing for the PDSCH transmission received in the FDD cell needs to be adjusted.

Introduction of New TDD Uplink/Downlink Configuration

A new carrier configured with only a downlink subframe and a special subframe for the TDD carrier may be introduced. That is, the TDD carrier does not have the uplink subframe. The terminal may transmit a sounding reference signal (SRS) using the special subframe. An FDD uplink carrier or a TDD carrier having an uplink subframe may be used to transmit uplink data.

Table 7 shows a TDD uplink/downlink configuration defined in the LTE Release-8~11. In Table 7, D denotes a downlink subframe, U denotes an uplink subframe, and S denotes a special subframe including a guard period.

TABLE 7

| Uplink-Downlink Configuration | Downlink-to-Uplink Switch-point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 8 shows an example of an additional TDD uplink/downlink configuration, and each configuration may include only a downlink subframe and a special subframe. The terminal may transmit an SRS in some or all of special subframes. The base station should notify the terminal of a configuration that is applied to the cell among all allowable TDD uplink/downlink configurations including an added uplink/downlink configuration.

TABLE 8

| Uplink-Downlink Configuration | Downlink-to-Uplink Switch-point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 7 | 5 ms | D | S | D | D | D | D | S | D | D | D |
| 8 | 10 ms | D | S | D | D | D | D | D | D | D | D |

Since the small cell has relatively smaller cell coverage than the macro cell, a guard period (GP) in the special subframe may be set as a small value. When a radius of the small cell is R and a propagation speed of light is C, a needed length of the guard period is a time needed for downlink-uplink switching+2R/C. For example, when the radius R of the small cell is 100 m, the length of the protection period is 2R/C micro seconds (us). Thus, considering that a downlink-uplink switching time of the terminal is 20 us, a length of one OFDM symbol including a cyclic prefix (CP) is allocated 71 us, and the remaining time periods may be used for downlink or uplink transmission. That is, for a normal CP, a total of 13 OFDM symbols may be used for the downlink or uplink transmission in one special subframe. Some symbols belonging to the special subframe may be used for SRS transmission. The LTE Release-8~10 specifications define that one or two symbols in the special subframe may be used for SRS transmission. Since an additional TDD downlink/uplink configuration does not have an uplink subframe, it is preferable that a larger number of symbols are allowed to be used for uplink SRS transmission.

Since the above-described downlink and sounding-dedicated TDD carrier cannot be used to transmit uplink data and control information, the carrier grouped by CA along with other carrier(s) that can transmit the uplink data and control information may be set to the terminal. That is, the UCI of HARQ-ACK information or the like for the PDSCH that occurs in the above-described downlink and sounding-dedicated TDD carrier among carriers set for the CA may be transmitted through Pcell. Another carrier (that is, an FDD carrier or a TDD carrier having an uplink subframe) that can carry uplink data and control information is set as Pcell.

Cell Discovery

Cell Discovery Signal

The terminal may search for and detect a discovery signal to find a neighboring cell. The discovery signal may be periodically transmitted via a downlink of the cell. A position in a time-frequency resource space of the discovery signal may be predefined in the specification or may be delivered in advance to the terminal by a base station that is connected with the terminal.

A dormant state may be introduced to the cell in order to save energy, and the cell may be allowed to transmit the discovery signal in order to find the cell in the dormant state. In this case, in the specification, the transmission/reception of the discovery signal should be defined. It is preferable that the discovery signal is transmitted at certain periods, and neighboring cells participate in all discovery signal transmissions in one allowable transmission period in consideration of an efficient discontinuous reception (DRX) operation of the terminal.

In order to increase a success rate of detecting the discovery signal of the terminal, it is preferable that neighboring cells do not use, as a data transmission resource, a time-frequency resource through which a discovery signal of any cell is transmitted.

The terminal may detect the discovery signal according to the request of the base station and report, to the base station, a measurement result obtained by measuring the detected discovery signal.

Contents of the reporting of the terminal may include the following information:
- Cell index or discovery signal index;
- Reception strength of discovery signal; and
- Reception timing information of discovery signal: e.g., reception timing information of discovery signal with respect to downlink subframe timing of a serving cell of the terminal.

The discovery signal may be transmitted using the downlink carrier for FDD.

For a TDD carrier, the discovery signal transmission should be designed in consideration of significant interference caused by an adjacent cell or terminal.

A method of transmitting a discovery signal using only downlink subframes 0, 1, 5, and 6 may be applied to the TDD. Subframes 1 and 6 may use a downlink pilot time slot (DwPTS) being a part that can be transmitted via a downlink in a special subframe. Subframes other than subframes 0, 1, 5, and 6 may be set as uplink subframes depending on the cell, because, when a temporal position of an uplink transmitted by another terminal overlaps a temporal position at which the discovery signal is transmitted, this could cause very significant interference to the terminal that receives the discovery signal, and thus the reception may not be adequately achieved.

In order to efficiently receive the discovery signal, a muting method may be used in which resources in which discovery signals of neighboring cells are transmitted are not used to transmit data. For a TDD carrier, muting of the uplink resource in addition to the downlink is also needed because the uplink transmission of the neighboring terminal may cause significant interference to the discovery signal reception. Information on resource elements on which muting is performed should be signaled to the terminal and then applied to rate matching of PDSCH/PUSCH.

Method for Enhancing Transmission/Reception of Small Cell

Method of Reporting RS and CSI

Downlink UE-Specific RS

A general channel environment of a small cell has weak frequency selectivity, and therefore an effect of scheduling in a frequency domain may be small. A terminal-specific reference signal (UE-specific reference signal) structure having a relatively low density may be considered as a frequency axis in consideration of the characteristics. That is, a plurality of terminal-specific reference signal structures are considered according to a channel environment of the terminal, a type of the cell, etc. Here, a terminal-specific reference signal denotes a reference signal used to decode PDSCH or EPDCCH. The plurality of terminal-specific reference signal structures are defined in the specification, and thus the terminal may recognize which reference signal structure is applied.

The following methods may be used as a scheme in which the terminal recognizes the form of the terminal-specific reference signal applied to the terminal.
- The base station notifies the terminal of the form of the terminal-specific reference signal through RRC signaling.
- The base station notifies the terminal that the form of the terminal-specific reference signal may be changed according to a PDSCH transmission format, through RRC signaling. Subsequently, the form of the terminal-specific reference signal transmitted to the terminal may be determined according to the PDSCH transmission format. Here, the PDSCH transmission format may include a modulation order, a size of a transport block, the number of allocated resource blocks, or the like.

Reporting of Downlink UE-Specific RS Based CSI

As described above, the channel environment of the small cell has weak frequency selectivity, and therefore an effect of scheduling in a frequency domain may be expected to be small. Accordingly, a position of a frequency axis of a resource allocated to the terminal need not be changed frequently. Considering the characteristics, it may be efficient that CSI reporting for the resource allocated to the terminal is performed. It can be appreciated that the CSI reporting based on a basic CSI-RS is performed for frequency-selective scheduling. On the contrary, for more accurate link adaption, a scheme of performing the CSI reporting needs to be introduced only to a resource selected by the base station. The terminal may generate CSI on the basis of terminal-specific RS (UE-specific RS) transmitted in the allocated resource and report the generated CSI to the base station.

While the example embodiments of the present invention and their advantages have been described in detail, it should be understood that various changes, substitutions and alterations may be made herein without departing from the scope of the invention.

The invention claimed is:

1. An inter-site carrier aggregation (CA) method performed in a terminal interworking with a first base station and a second base station, the method comprising:
   receiving physical downlink control channels (PDCCHs) or enhanced physical downlink control channels (EPDCCHs) for scheduling physical downlink shared channels (PDSCHs) of cells constituting a primary cell group (PCG) from the first base station, the PCG comprising a first primary cell and one or more secondary cells;
   receiving PDCCHs or EPDCCHs for scheduling PDSCHs of cells constituting a secondary cell group (SCG) from the second base station, the SCG comprising a second primary cell and one or more secondary cells;
   receiving the PDSCHs by using the cells constituting the PCG;
   receiving the PDSCHs by using the cells constituting the SCG;
   transmitting physical uplink control channels (PUCCHs) including acknowledgment information for the PDSCHs received by using the cells constituting the PCG through the first primary cell; and
   transmitting PUCCHs including acknowledgement information for the PDSCHs received by using the cells constituting the SCG through the second primary cell.

2. The inter-site CA method according to claim 1, further comprising:
   receiving PDCCHs or EPDCCHs for scheduling physical uplink shared channels (PUSCHs) of the cells constituting the PCG from the first base station;
   receiving PDCCHs or EPDCCHs for scheduling PUSCHs of the cells constituting the SCG from the second base station;
   transmitting the PUSCHs of the cells constituting the PCG through the cells constituting the PCG; and
   transmitting the PUSCHs of the cells constituting the SCG through the cells constituting the SCG.

3. The inter-site CA method according to claim 1, wherein the terminal receives configuration information for the PCG, the SCG, and the second primary cell from the first base station via Radio Resource Control (RRC) signaling.

4. The inter-site CA method according to claim 1, wherein the cells constituting the primary cell group are cells managed by the first base station, and the cells constituting the secondary cell group are cells managed by the second base station.

5. The inter-site CA method according to claim 1, wherein the cells constituting the primary cell group are macro cells, and the cells constituting the secondary cell group are small cells.

6. The inter-site CA method according to claim 1, wherein the terminal monitors PDCCHs or EPDCCHs set with a System Information-Radio Network Temporary Identity (SI-RNTI) on the first primary cell, and the terminal does not monitor PDCCHs or EPDCCHs set with the SI-RNTI on the second primary cell.

7. An inter-site carrier aggregation (CA) method performed in a second base station interworking with a terminal and a first base station, the first base station managing a primary cell group (PCG) comprising a first primary cell and one or more secondary cells, the method comprising:
    transmitting, to the terminal, physical downlink control channels (PDCCHs) or enhanced physical downlink control channels (EPDCCHs) for scheduling physical downlink shared channels (PDSCHs) of cells constituting a secondary cell group (SCG), the SCG comprising a second primary cell and one or more secondary cells;
    transmitting, to the terminal, the PDSCHs by using the SCG;
    receiving, from the terminal, physical uplink control channels (PUCCHs) including acknowledgment information for the PDSCHs transmitted by using the SCG through the second primary cell
    wherein configuration information for the PCG, the SCG and the second primary cell is transmitted to the terminal from the first base station via Radio Resource Control (RRC) signaling.

8. The inter-site CA method according to claim 1, further comprising:
    receiving a PDCCH including downlink control information (DCI) of format 3/3A for transferring a power control command for the PUCCHs of the PCG through the first primary cell; and
    receiving a PDCCH including DCI of format 3/3A for transferring a power control command for the PUCCHs of the SCG through the second primary cell.

9. The inter-site CA method according to claim 1, further comprising:
    receiving a PDCCH including downlink control information (DCI) of format 3/3A for transferring a power control command for the PUCCHs of the PCG through the first primary cell; and
    receiving a PDCCH including DCI of format 3/3A for transferring a power control command for the PUCCHs of the SCG through the second primary cell.

10. The inter-site CA method according to claim 7, wherein the terminal monitors PDCCHs or EPDCCHs set with a Paging-Radio Network Temporary Identity (P-RNTI) on the first primary cell, and the terminal does not monitor PDCCHs or EPDCCHs set with the P-RNTI on the second primary cell.

11. The inter-site CA method according to claim 7, wherein the cells constituting the PCG are macro cells, and the cells constituting the SCG are small cells.

12. The inter-site CA method according to claim 7, further comprising:
    transmitting a PDCCH including downlink control information (DCI) of format 3/3A for transferring a power control command for the PUCCHs of the SCG through the second primary cell.

13. The inter-site CA method according to claim 7, further comprising:
    transmitting a PDCCH including downlink control information (DCI) of format 3/3A for transferring a power control command for the PUSCHs of the SCG through the second primary cell.

14. The inter-site CA method according to claim 7, wherein PDCCHs or EPDCCHs set with a System Information-Radio Network Temporary Identity (SI-RNTI) are not monitored by the terminal on the second primary cell.

15. The inter-site CA method according to claim 7, wherein PDCCHs or EPDCCHs set with a Paging-Radio Network Temporary Identity (P-RNTI) are not monitored by the terminal on the second primary cell.

* * * * *